(12) United States Patent
Zhang et al.

(10) Patent No.: US 12,482,093 B2
(45) Date of Patent: Nov. 25, 2025

(54) IMAGE REGION OF INTEREST DEFECT DETECTION

(71) Applicants: HEWLETT-PACKARD DEVELOPMENT COMPANY, L.P., Spring, TX (US); PURDUE RESEARCH FOUNDATION, West Lafayette, IN (US)

(72) Inventors: Runzhe Zhang, West Lafayette, IN (US); Yousun Bang, Pangyo (KR); Minki Cho, Pangyo (KR); Mark Shaw, Boise, ID (US); Jan Allebach, West Lafayette, IN (US); Yi Yang, West Lafayette, IN (US)

(73) Assignee: HEWLETT-PACKA RD DEVELOPMENT COMPANY, LP., Spring, TX (US)

( * ) Notice: Subject to any disclaimer, the term of this patent is extended or adjusted under 35 U.S.C. 154(b) by 341 days.

(21) Appl. No.: 18/271,209

(22) PCT Filed: Jan. 13, 2021

(86) PCT No.: PCT/US2021/013285
§ 371 (c)(1),
(2) Date: Jul. 6, 2023

(87) PCT Pub. No.: WO2022/154787
PCT Pub. Date: Jul. 21, 2022

(65) Prior Publication Data
US 2025/0278827 A1 Sep. 4, 2025

(51) Int. Cl.
*G06T 7/00* (2017.01)
*G06T 5/20* (2006.01)
(Continued)

(52) U.S. Cl.
CPC .............. *G06T 7/001* (2013.01); *G06T 5/20* (2013.01); *G06T 5/70* (2024.01); *G06T 7/11* (2017.01);
(Continued)

(58) Field of Classification Search
CPC .. G06T 7/001; G06T 5/20; G06T 5/70; G06T 7/11; G06T 7/13; G06T 7/90;
(Continued)

(56) References Cited

U.S. PATENT DOCUMENTS 6,612,676 B1 9/2003 Minckler
8,654,369 B2 2/2014 Kogan et al.
(Continued)

FOREIGN PATENT DOCUMENTS

CN 105354599 B 10/2019
JP 2010-010838 A 1/2010
(Continued)

OTHER PUBLICATIONS

Wang et al., "Local defect detection and print quality assessment" www.ingentaconnect.com, Society for Imaging Science and Technology, Feb. 14, 2016, p. 1, 3, 4 & 5.

*Primary Examiner* — Jose L Couso
(74) *Attorney, Agent, or Firm* — Michael Dryja

(57) ABSTRACT

According to examples, an apparatus may include a processor and a memory on which are stored computer-readable instructions that, when executed by the processor, may cause the processor to access a master image to be printed and receive a scanned image corresponding to the master image. The processor may identify a defect in a scanned image region of interest (ROI) based on the master image. A type of the scanned image ROI may include a raster ROI, a symbol ROI, a background ROI, and/or a color vector ROI, and the identified defect may be associated with the type of
(Continued)

the scanned image ROI. The processor may determine a severity of the identified defect of the scanned image and may output the determined severity.

12 Claims, 13 Drawing Sheets

(51) Int. Cl.
*G06T 5/70* (2024.01)
*G06T 7/11* (2017.01)
*G06T 7/13* (2017.01)
*G06T 7/90* (2017.01)

(52) U.S. Cl.
CPC ............. *G06T 7/13* (2017.01); *G06T 7/90* (2017.01); *G06T 2207/10008* (2013.01); *G06T 2207/10024* (2013.01); *G06T 2207/20032* (2013.01); *G06T 2207/30144* (2013.01)

(58) Field of Classification Search
CPC . G06T 2207/10008; G06T 2207/10024; G06T 2207/20032; G06T 2207/30144; G06T 7/0002; G06F 18/23; G06F 18/23213; G06F 3/1208; G06F 3/121; G06F 3/1235; G06F 3/1259; G03G 15/01; G03G 2215/00569; G03G 2215/0177; G06V 10/993; G06V 10/50; G06V 10/757; G06V 30/10; G06V 30/418; G06K 15/025; G06K 15/027; H04N 1/00029; H04N 1/047; H04N 1/4074; H04N 1/409; H04N 1/4092; H04N 1/00015; H04N 1/00031; H04N 1/00034; H04N 1/00037; H04N 1/00047; H04N 1/00005; H04N 1/00002; H04N 1/00058; H04N 1/00068; H04N 1/00074; H04N 1/00087; H04N 1/603; H04N 1/6036; H04N 1/6041; H04N 1/6047; H04N 1/605; B41J 2/17566; B41J 12/2139; B41J 2002/17569; B41J 29/393; B41J 2/525
See application file for complete search history.

(56) References Cited

U.S. PATENT DOCUMENTS

| | | | |
|---|---|---|---|
| 10,834,283 B2 * | 11/2020 | d'Armancourt ... | H04N 1/00029 |
| 10,999,460 B2 * | 5/2021 | d'Armancourt ... | H04N 1/00015 |
| 2002/0163570 A1 | 11/2002 | Phillips | |
| 2010/0177330 A1 * | 7/2010 | Wu .................... | H04N 1/32502 |
| | | | 358/1.9 |
| 2011/0069894 A1 | 3/2011 | Vans et al. | |
| 2011/0279513 A1 * | 11/2011 | Mizes .................... | B41J 29/393 |
| | | | 347/19 |
| 2013/0242354 A1 * | 9/2013 | Dewancker ........ | H04N 1/00005 |
| | | | 358/448 |
| 2014/0092419 A1 * | 4/2014 | Yamagishi ......... | H04N 1/00047 |
| | | | 358/1.14 |
| 2014/0139851 A1 * | 5/2014 | Mizes .................... | B41J 29/393 |
| | | | 358/1.9 |
| 2018/0183941 A1 * | 6/2018 | Houle ................ | H04N 1/00076 |
| 2019/0289152 A1 * | 9/2019 | Tsue ....................... | H04N 1/409 |
| 2020/0358929 A1 | 11/2020 | Maggard et al. | |
| 2022/0309634 A1 * | 9/2022 | Atwood ................ | G06V 10/82 |
| 2023/0066402 A1 * | 3/2023 | Haruta .................... | G06T 7/001 |
| 2023/0068167 A1 * | 3/2023 | Lubin .................... | B41J 2/2135 |

FOREIGN PATENT DOCUMENTS

| | | | | |
|---|---|---|---|---|
| JP | 2014071045 A | * | 4/2014 | ............. G06T 7/001 |
| JP | 2018054560 A | * | 4/2018 | ............. B41J 2/2146 |
| WO | 2018/140001 A1 | | 8/2018 | |

* cited by examiner

IMAGE REGION OF INTEREST DEFECT DETECTION

BACKGROUND

Printers may process image data associated with an image to print the image. The printed image may include defects.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
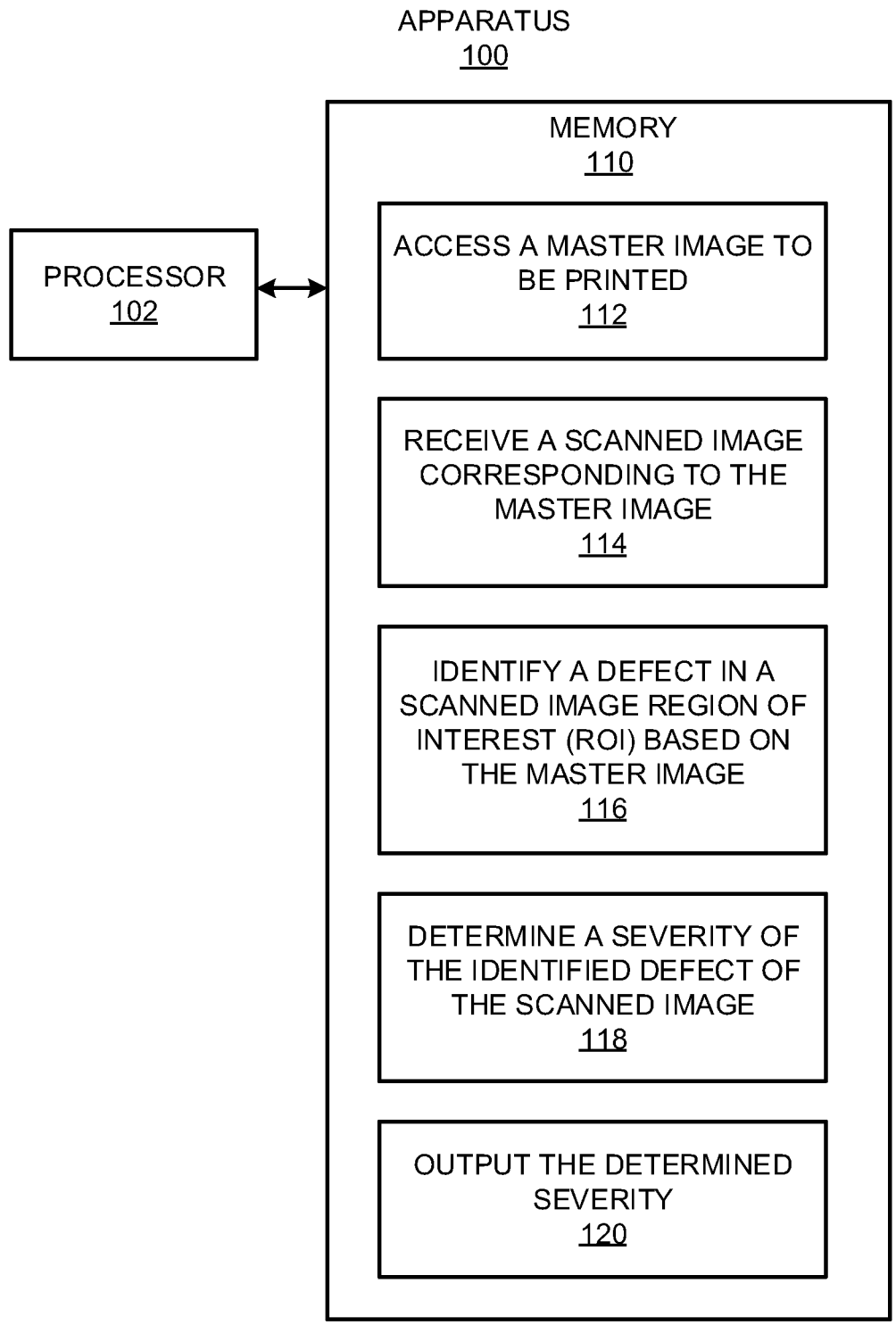
FIG. 1 depicts a block diagram of an example apparatus that may identify a defect in a scanned image region of interest.

For simplicity and illustrative purposes, the present disclosure is described by referring mainly to examples. In the following description, numerous specific details are set forth in order to provide a thorough understanding of the present disclosure. It will be readily apparent, however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

In some examples, processors may determine defects in printed documents. However, some techniques to detect defects may have certain deficiencies. For instance, some techniques may detect defects using a predetermined test image, but such techniques may result in wasted resources, for instance, printing of the test image. As another example, some techniques may be able to detect black text fading, but not color text fading.

Disclosed herein are apparatuses, systems, methods, and computer-readable media for print defect detection using a scanned image (or customer image) in lieu of a dedicated test image. In some examples, a processor may detect color text fading using customer images. As discussed herein, the processor may extract a region of interest (ROI) from a scanned image, and may detect different types of defects in the scanned ROI.

In one aspect, the processor may detect color fading defects in a raster ROI by use of a "SLIC" Super-pixels algorithm and a clustering classification algorithm using a distance matrix of color differences, for instance, Euclidean Distances between data points. In another aspect, the processor may detect text fading defects in which text characters from a master ROI and scanned ROI are extracted and each character is aligned, and a color difference value (e.g., ΔE) for each character is calculated. The processor may rank the text fading defect and may predict that a colorant cartridge is depleted. In another aspect, the processor may detect streaking defects which may appear in a scanned image ROI. In another aspect, the processor may detect banding defects which may appear in a scanned image ROI.

By enabling defect detection using a scanned image, the use of dedicated test images for defect detection may be avoided, thereby improving the efficiency/speed of defect detection and reducing consumption of resources by the printer. In some examples, the defect detection may enable a processor to predict depleted print cartridges and/or to identify other defective components of the printer, such as fuser rollers, and/or the like, thereby reducing costs associated with maintenance and servicing of the printers.

Figure 2:
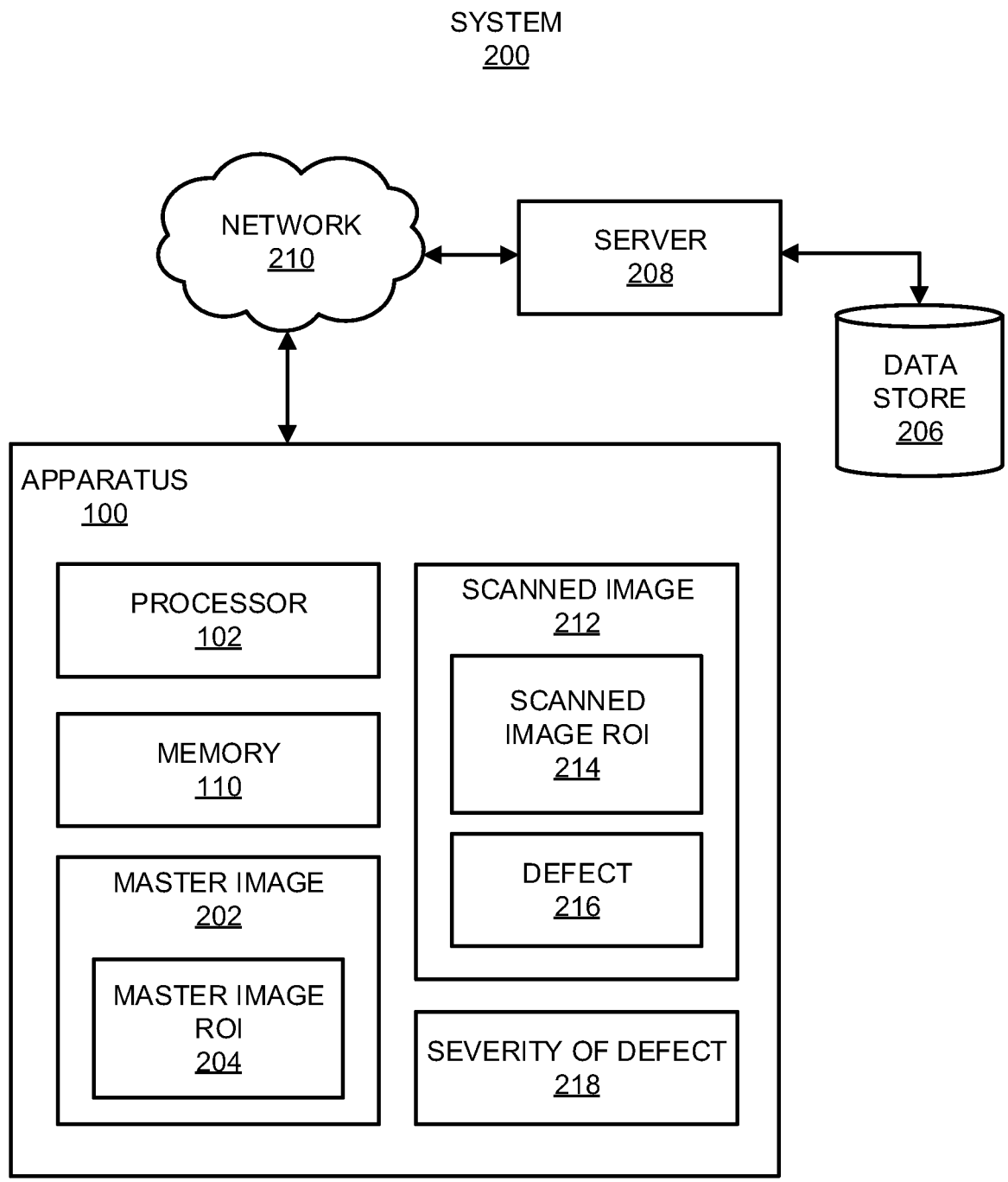
FIG. 2 shows a block diagram of an example system within which the example apparatus depicted in FIG. 1 may be implemented.

Reference is first made to FIGS. 1 and 2. FIG. 1 depicts a block diagram of an example apparatus that may identify a defect in a scanned image region of interest. FIG. 2 shows a block diagram of an example system within which the example apparatus depicted in FIG. 1 may be implemented. It should be understood that the apparatus 100 depicted in FIG. 1 and the system 200 depicted in FIG. 2 may include additional features and that some of the features described herein may be removed and/or modified without departing from the scopes of the apparatus 100 and the system 200.

The apparatus 100 may be implemented in a printer, such as a laser printer, a photo printer, an inkjet printer, or the like, although in other examples the apparatus may be a computing device that is separate from a printer. As shown, the apparatus 100 may include a processor 102 and a non-transitory computer-readable medium, e.g., a memory 110. The processor 102 may be a semiconductor-based microprocessor, a central processing unit (CPU), an application-specific integrated circuit (ASIC), a field-programmable gate array (FPGA), and/or other hardware devices. Although the apparatus 100 is depicted as having a single processor 102, it should be understood that the apparatus 100 may include additional processors and/or cores without departing from a scope of the apparatus 100 and/or system 200. In this regard, references to a single processor 102 as well as to a single memory 110 may be understood to additionally or alternatively pertain to multiple processors 102 and/or multiple memories 110.

The memory 110 may be an electronic, magnetic, optical, or other physical storage device that contains or stores executable instructions. The memory 110 may be, for example, Read-Only Memory (ROM), flash memory, solid-state drive, Random Access memory (RAM), an Electrically Erasable Programmable Read-Only Memory (EEPROM), a storage device, an optical disc, or the like. In some examples, the memory 110 may be integrated in the processor 102, which may contain or store executable instructions, for instance, in an ASIC. The memory 110 may be a non-transitory computer-readable medium. The term "non-transitory" does not encompass transitory propagating signals.

As shown in FIG. 1, the processor 102 may execute instructions 112-120 to identify a defect in a scanned image region of interest (ROI) based on a master image. The instructions 112-120 may be computer-readable instructions, e.g., non-transitory computer-readable instructions. In other examples, the apparatus 100 may include hardware logic blocks or a combination of instructions and hardware logic blocks to implement or execute functions corresponding to the instructions 112-120.

The processor 102 may fetch, decode, and execute the instructions 112 to access a master image 202 to be printed. The master image 202 may include a master image ROI 204, which may include a raster ROI, a symbol ROI, a background ROI, and/or a color vector ROI. The ROI may be a region within the image having a particular type of content or characteristic such as a raster image, text, or the like. In some examples, the master image 202 may be stored in the memory 110. Alternatively or additionally, the master image 202 may be stored in a data store 206 at a server 208 or a network connected printer/scanner, with which the apparatus 100 may be in communication via a network 210, and/or the like.

The processor 102 may fetch, decode, and execute the instructions 114 to receive a scanned image 212 corresponding to the master image 202. The scanned image 212 may include a scanned image ROI 214, which may include a raster ROI, a symbol ROI, a background ROI, and/or a color vector ROI. In some examples, the scanned image 212 may be scanned at a printer as the printed image is being printed.

The processor 102 may fetch, decode, and execute the instructions 116 to identify a defect 216 in the scanned image ROI 214 based on the master image 202. For instance, the processor 102 may compare the scanned image ROI 214 with the master image 202 to identify the defect 216. In some examples, the identified defect 216 may be associated with a type of the scanned image ROI 214. By way of particular example and for purposes of illustration, a color fading defect may be associated with the raster ROI, a text fading defect may be associated with the symbol ROI, and/or the like.

The processor 102 may fetch, decode, and execute the instructions 118 to determine a severity 218 of the identified defect 216 of the scanned image 212. In some examples, the severity 218 may be represented by a ranking against other defects. The processor 102 may fetch, decode, and execute the instructions 120 to output the determined severity 218 of the identified defect 216. In some examples, the output severity 218 of the defect 216 may be used to predict a state of components of the printer, such as a depleted cartridge of colorant, defective rollers, and/or the like.

The identified defect 216 in the scanned image ROI 214 may be color fading, text fading, streaking, and/or banding. Each of these defects and the apparatuses, systems, methods, and computer-readable media for detecting these defects are described in detail hereinafter.

1.1. Color Fading Detection

Figure 3:
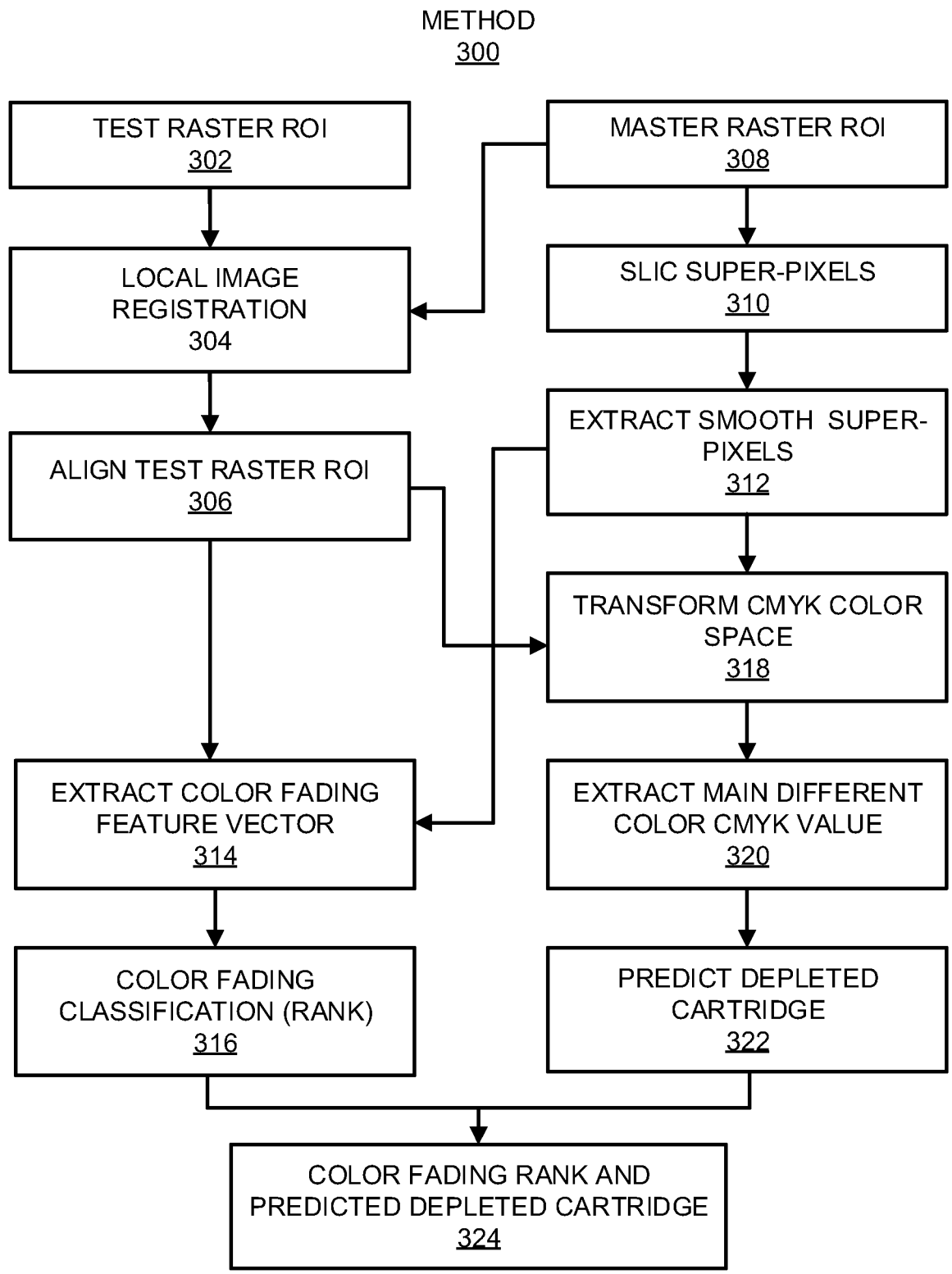
FIG. 3 shows a flow diagram of an example method for identifying color fading and classification.
Figure 4:
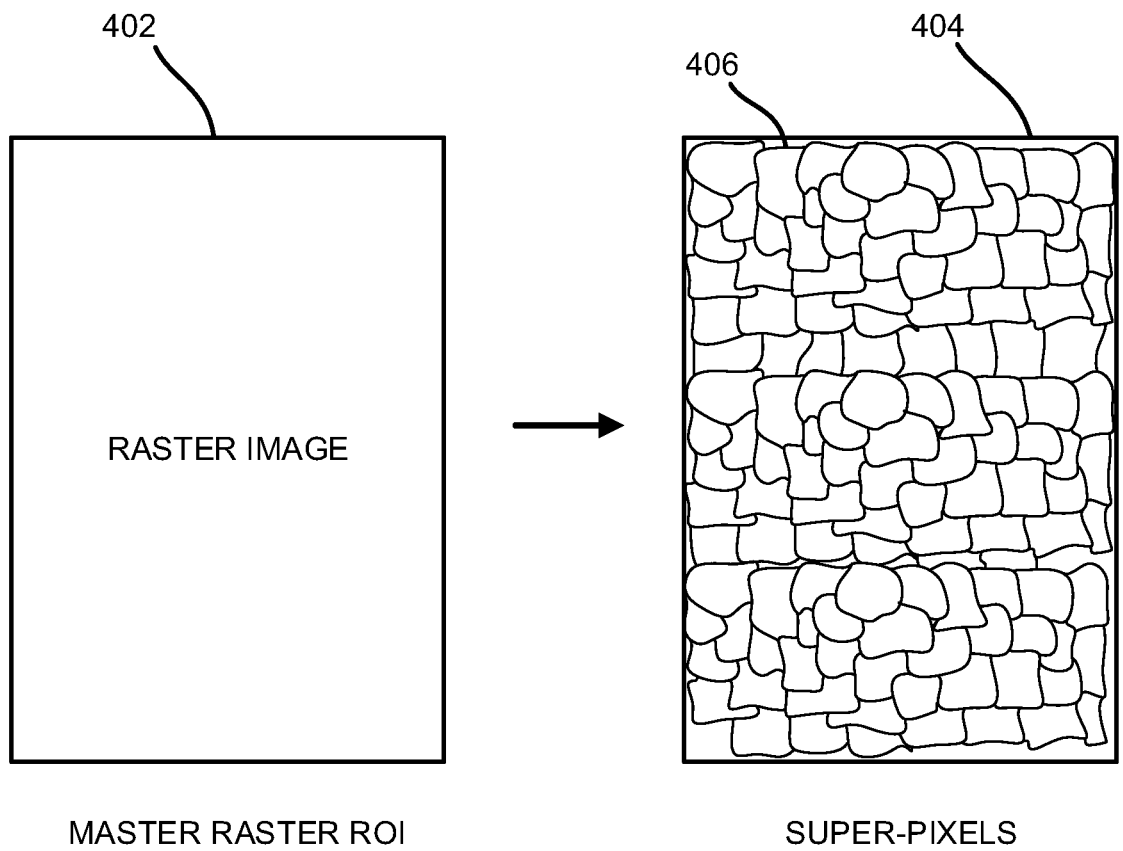
FIG. 4 shows a diagram of an example raster image and the raster image segmented into super-pixels.
Figure 5:
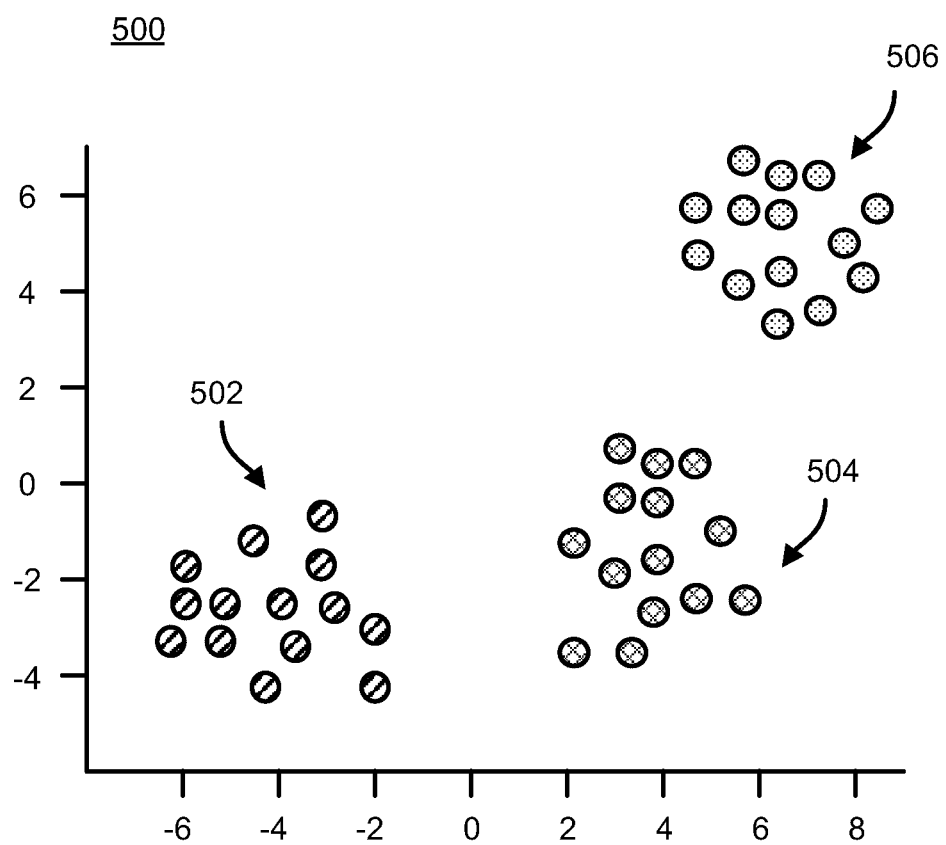
FIG. 5 shows a chart of example data points representing super-pixels classified based on their color in a color space.
Figure 6:
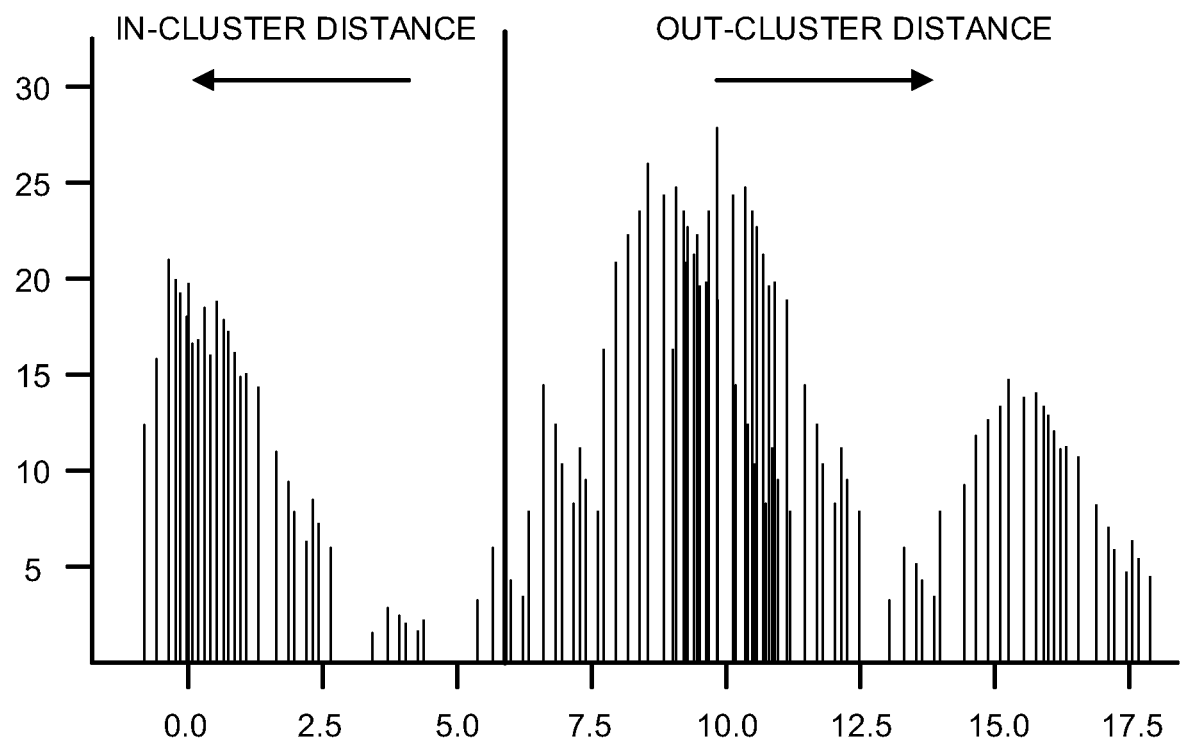
FIG. 6 shows a chart of an example histogram of a distance of the data points depicted in FIG. 5.
Figure 7:
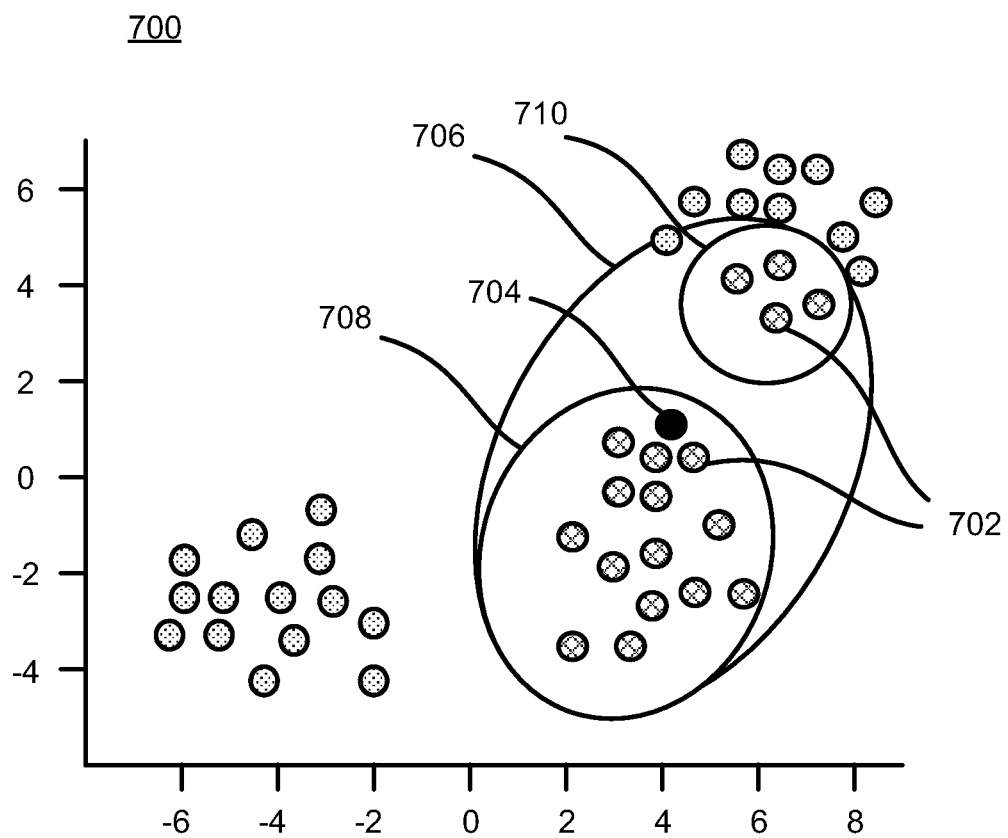
FIG. 7 shows a chart of an example cluster result of the data points representing the super-pixels depicted in FIGS. 5 and 6.

Reference is made to FIGS. 3 to 7. Various manners in which the processor 102 may operate are discussed in greater detail with respect to the method 300 depicted in FIG. 3, which shows a flow diagram of an example method for identifying color fading and classification. FIG. 4 shows a diagram of an example raster image and the raster image segmented into super-pixels. FIG. 5 shows a chart of example data points representing super-pixels classified based on their color in a color space. FIG. 6 shows a chart of an example histogram 600 of a distance matrix of the data points depicted in FIG. 5 and FIG. 7 shows a chart of an example cluster result of the data points representing the super-pixels depicted in FIGS. 5 and 6. It should be understood that the method 300 depicted in FIG. 3 as well as the features depicted in FIGS. 4 to 7 may include additional operations and features, and that some of the operations and features described therein may be removed and/or modified without departing from the scope of the method 300. The description of the method 300 is made with reference to the features depicted in FIGS. 1 and 2 for purposes of illustration.

A common printer issue in electrophotographic printers is color fading defect. Color fading defects may be defined as faint print or faded content, and may be caused by a low level ink/cartridge. As described herein, the processor 102 may use a Simple Linear Iterative Clustering ("SLIC") Super-pixels method to separate the scanned image ROI 214 and extract smooth super-pixels. In this regard, the scanned image ROI 214 may be a scanned image raster ROI. A super-pixel as referred to herein may be a group of pixels. The separation method as described herein may be more accurate than conventional methods in extracting a color from a master ROI, such as the master image ROI 204 depicted in FIG. 2, and a test raster ROI, such as the scanned image ROI 214 depicted in FIG. 2. Furthermore, to predict the problem cartridge, disclosed herein is a cluster classification method, which may be more efficient than previous classification methods. The cluster classification algorithm as described herein can extract only the main cluster and may not classify all the super-pixels. This method may be better than using, for instance, a mean shift algorithm because some of the super-pixels may not be the main color, which may make it difficult to detect the color fading defect and which may influence the final color fading detection result.

As described herein, the processor 102 may only extract the real main cluster colors in the raster ROI, rather than all areas of a raster ROI. Firstly, the processor 102 may use the "SLIC" Super-pixels algorithm to separate the raster ROI and only keep the smooth super-pixels. The processor 102 may then apply a classification algorithm to extract the main cluster colors from the smooth super-pixels. This classification method may be more efficient than, for instance, a means shift algorithm. Next, the processor 102 may use the main cluster colors to predict that a cartridge of the printer is depleted. Additionally, the processor 102 may extract a feature vector of the color fading defects in the raster ROI and may classify the rank of color fading defects.

1.2. Raster ROI Color Fading Detection and Classification Procedure

In this section, the details of raster ROI color fading detection and classification procedure are described. FIG. 3 shows a flow diagram of an example method for detecting color fading and classification. This procedure may include three parts: a raster ROI preprocessing part (blocks 302, 304, and 306 and blocks 308, 310, and 312), a color fading classification part (blocks 314 and 316), and a predict the depleted cartridge part (blocks 318, 320, and 322). In the first part, the raster ROI preprocessing part, the processor 102 may align the test raster ROI based on the master raster ROI to get the aligned test raster ROI (block 306). In this regard, the test raster ROI may be the scanned image ROI 214 and the master raster ROI may be the master image ROI 204, depicted in FIG. 2. Additionally, the processor 102 may use the "SLIC" Super-pixels method (block 310) to separate the master raster ROI into several super-pixels based on the color and the position of the pixels. Then, the processor 102 may extract the smooth super-pixels (block 312) to detect the color fading defects because the very colorful super-pixels are not good to extract the color difference between the master raster ROI and test raster ROI.

In the second part (blocks 314 and 316), the processor 102 may extract the color fading feature vector (block 314) by comparing the master and test raster ROI smooth super-pixels in a color space, for instance, in the CIE L*a*b* color space. Then, the processor 102 may use, for instance, the Directed Acyclic Graph-Support Vector Machine (DAG-SVM) to classify the rank of the color fading defect (block 316) in test raster ROI.

In the third part (blocks 318, 320, and 322), the processor 102 may use the smooth super-pixels to extract the main cluster colors (block 320) from the master raster ROI. In this step, the processor 102 may apply a cluster classification method as described herein, which may be more efficient and accurate than the mean shift or K-means algorithm. After the main cluster colors super-pixels are extracted, the processor 102 may predict the depleted cartridge (block 322) based on each main color analysis.

1.3. Raster ROI Preprocessing

In this section, the raster ROI preprocessing for color fading detection and classification is described. It includes three parts: raster ROI image registration (block 304), "SLIC" Super-pixels separating master raster ROI (block 310), and extracting smooth super-pixels (block 312). The image registration may be to remove the misalignment between the master and test raster ROI. The "SLIC" Super-pixels algorithm may be implemented to separate the master raster ROI based on the color and position of the pixels. After we have the "SLIC" Super-pixels result, the processor 102 may remove the super-pixels' high variance and may keep the smooth super-pixels.

1.3.1 "SLIC" Super-Pixels for Master Raster ROI

After the test raster ROI is aligned, the processor 102 may separate the master raster ROI into several small parts, because in each small parts of the raster ROI may have a substantially uniform color, and it may be easy to extract the difference between two uniform color areas in master and test raster ROIs.

The processor 102 may apply the "SLIC" algorithm. In some examples, the only input may be k, which may be the number of approximately equally-sized super-pixels. The processor 102 may first transform the master raster ROI in, for instance, the CIE L*a*b* color space and initialize the k cluster centers $C_i=[l_i,a_i,b_i,x_i,y_i]^T$ sampled on a regular grid spaced S pixels apart, where $S=\sqrt{N/k}$ and N is the number of pixels in the raster ROI. To avoid the centers of the super-pixels on edge, the gradient of 3×3 neighbor pixels of the center may be calculated and moved to the lowest gradient position. After k initialized cluster centers are obtained, each pixel i may be assigned. For each super-pixel center, the distance measure D may be calculated for each pixel in the 2S×2S area. This distance measure of D will be introduced in the next paragraph. Because each super-pixel size is approximately S×S, each pixel i will have several distance measures D for different neighboring super-pixel's center, and the smallest distance measure D determines the nearest super-pixel center for each pixel i. After every pixel in the raster, ROI has the nearest super-pixel center, and the center of every new super-pixels may be updated by calculating the mean of $[L',a^*,b^*,x,y]^T$ vector of all of the pixels belonging to the same super-pixel. Then, calculation of the distance measure D is repeated for each pixel and the center of new super-pixels is found, until the centers of the super-pixels are almost fixed or reach a fixed iteration number.

$$d_c = \sqrt{(L_j - L_i)^2 + (a_j - a_i)^2 + (b_j - b_i)^2}$$

$$d_s = \sqrt{(x_j - x_i)^2 + (y_j - y_i)^2}$$

$$D = \sqrt{\left(\frac{d_c}{N_c}\right)^2 + \left(\frac{d_s}{N_s}\right)^2} = \sqrt{\left(\frac{d_c}{m}\right)^2 + \left(\frac{d_s}{S}\right)^2}$$

Equation 1.1

The distance measure of D is defined in Equation 1.1. $d_c$ is the color, $L_2$ norm distance between the pixel i and the super-pixel center j, and ds is the space $L_2$ norm distance between the pixel i and the super-pixel's center j. To combine the two distances into a single measure, the color proximity and skeptical proximity may be normalized by their respective maximum distance within a cluster. $N_s$ is the maximum spatial distance in a given cluster and $Ns=S=\sqrt{N/k}$. $N_c$ is the maximum color distance in a given cluster and a constant for each given super-pixel, and m is used to present this constant.

FIG. 4 shows a diagram of an example raster image 402 and the raster image 404 segmented into super-pixels 406. The raster image 402 may be a master image ROI and the raster image 404 may include a "SLIC" Super-pixels result of the master raster ROI, for a predetermined k value.

1.3.2 Extract Smooth Super-Pixels

It may be desirable to detect the color fading defect using the "SLIC" Super-pixels result, but some of these super-pixels 406 may include multiple colors. This kind of super-pixels is not good for detecting the color fading defect. It may be preferable to compare a uniform color area between master and test raster ROI to extract the color difference. So, the next step may be to extract the smooth super-pixels from the master raster ROI (block 312). The master raster ROI may be transformed into a predetermined color space, for instance, the CIE L*a*b* color space and Equation 1.2 may be used to calculate the variance of the super-pixel. In Equation 1.2, M is the number of pixels in the corresponding super-pixel, and i indicates each pixel.

$$L_{ave} = \frac{\sum_{i=1}^{M} L_i}{M}, a_{ave} = \frac{\sum_{i=1}^{M} a_i}{M}, b_{ave} = \frac{\sum_{i=1}^{M} b_i}{M},$$

$$\Delta E_i = \sqrt{(L_i - L_{ave})^2 + (a_i - a_{ave})^2 + (b_i - b_{ave})^2},$$

$$\Delta E_{ave} = \frac{\sum_{i=1}^{M} \Delta E_i}{M},$$

$$\Delta E_{variance} = \frac{\sum_{i=1}^{M} (\Delta E_i - \Delta E_{ave})}{M - 1},$$

Equation 1.2

After calculate the $\Delta E_{variance}$ of each super-pixels is calculated, a threshold may be set to remove the colorful super-pixels, in which the $\Delta E_{variance}$ value may be higher than the threshold. This threshold may be an experimental parameter. The threshold may be tested in several master raster ROIs and from a predetermined range, for instance, 3 to 15, and samples of different thresholds may be provided to extract the smooth super-pixels result. Based on the experimental result, the processor 102 may set the threshold within the range, for instance, 3 to 15.

1.4. Raster ROI Color Fading Detection and Classification

In this section, the color fading feature vector (block 314) may be extracted by comparing the difference between the master and test raster ROI and this feature vector may be used to detect and classify the test raster ROI color fading defect (block 316).

1.4.1 Color fading Defect Feature Vector Extraction

The first step may be to transform a color space of the master and test raster ROI, for example, to CIE L*a*b* color space because the most common way to compare the difference between different colors may be to calculate the ΔE value (or color difference), which is the Euclidean distance between two colors in the CIE L*a*b* color space.

In the color fading feature vector, we calculate the average L',a*,b* for the master, and test raster ROI. These are the first six features in the color fading feature vector. The average ΔE between the master and test raster ROI may then be calculated and especially for smooth super-pixels. The ΔE value for each corresponding super-pixels in the master and test raster ROI may be calculated first by calculating the Euclidean distance between the average L',a*,b* of corresponding master and test raster ROI super-pixels. The average of the whole raster ROI super-pixel ΔE value and the smooth raster ROI super-pixels ΔE value may be calculated separately for the color fading features. These two ΔE values and the average of L',a*,b' values of the master and test raster ROI are the features to classify the color fading defect.

1.4.2 Color Fading Defect Multi-Classification

After the feature vector of the raster ROI color fading defect is extracted, this feature vector may be used to classify the raster ROI color fading defect into four different ranks (block 316). The description of these four kinds of ranks may be the same as to the color fading defect: Rank A may mean no color fading defects in the raster ROI; Rank B may mean there are color fading defects in the raster ROI, and the defect does not affect the regular use of the printer page; Rank C may mean there is an observe color fading defect and people can find it easily; and Rank D may mean there are a large number of color fading defects and the defects influence the regular use of the printed page.

In some examples, raster ROI color fading defects may include eight features. We may have 52 raster ROI streak defects images, and they may be 15 images Rank A, 5 images Rank B, 15 images Rank C, and 17 images Rank D. The multi-classification model may be, for instance, Directed Acyclic Graph-Support Vector Machine (DAG-SVM). To evaluate this multi-classification result, the cross-validation for this model may be applied. 52 raster ROIs may be separated into 5 folds, such as (10/10/10/11/11) raster ROI color fading defects ground truth for each fold. Each fold may be used as the test set one time, and the other four folds are used as training sets. The final confusion matrix for this five-folds cross-validation is shown in Table 1. By way of particular example, the accuracy of this multi-classification model may be 82.7%.

TABLE 1

|  | Predict A | Predict B | Predict C | Predict D |
| --- | --- | --- | --- | --- |
| Real A | 13 | 2 | 0 | 0 |
| Real B | 0 | 4 | 1 | 0 |
| Real C | 0 | 1 | 12 | 2 |
| Real D | 0 | |0 | 3 | 14 |

1.5. Main Colors Extraction and Depleted Cartridge Prediction

In section 1.3.2, the processor 102 may have extracted the smooth super-pixels from the raster ROI (block 312). Usually, there may be at most three to five main colors in each raster ROI. It may be preferable to extract the super-pixels belonging to the same main color in raster ROI and using these same color super-pixels to predict the depleted cartridge. So, the first step may be to extract the main cluster colors of the raster ROI.

There are many unsupervised cluster classification methods, such as K-means and mean shift algorithms, which may not have sufficiently positive results. There may be two reasons for this: one reason may be that all of these cluster classification algorithms classify all of the smooth super-pixels in the raster ROI, but we only want to extract most similar main cluster color super-pixels and do not need to classify all the smooth super-pixels. Another reason may be that all of these algorithms may require a relatively large number of calculations. In contrast, the main cluster extraction algorithm as described in the present disclosure may extract the most similar main color super-pixels only and very efficiently. This algorithm is introduced first.

1.5.1 New Cluster Classification Algorithm

By way of particular example and for purposes of illustration, the cluster classification algorithm may use 100 sample points, which belong to three different Gaussian distributions. The processor 102 may use the position x, y coordinate of the sample points to classify the sample points. This process is very similar to classifying the super-pixels based on their color in color space, and the difference may be, for instance, the dimension of data. FIG. 5 shows a chart 500 of sample points from three Gaussian distributions, and these sample points may be found to belong to three clusters 502, 504, and 506. In FIG. 5, two dimensions of a color space is represented for purposes of illustration. In this regard, the horizontal axis may represent one dimension of a color space, such as L*, and the vertical axis may represent a second dimension of the color space, such as a*. It should be understood that other dimensions, and in different color spaces, may be implemented without departing from the scope of the present disclosure.

The first step may be to calculate the Euclidean Distance between every two sample points and the distance matrix for the sample points may be obtained, as shown in Table 2. In the distance matrix of Table 2, $D_{1,2}$ may be the distance from point 1 to point 2. This distance matrix shows the distance between every two points, so the diagonal elements of this matrix may always be zero and this distance matrix must be symmetric because the distance from point A to point B may be same as the distance from point B to point A.

TABLE 2

Distance Matrix of 100 Sample Points

|  | Point 1 | Point 2 | Point 3 | . . . . . . | Point 99 | Point 100 |
| --- | --- | --- | --- | --- | --- | --- |
| Point 1 | 0 | $D_{1,2}$ | $D_{1,3}$ | . . . . . . | $D_{1,99}$ | $D_{1,100}$ |
| Point 2 | $D_{2,1}$ | 0 | $D_{2,3}$ | . . . . . . | $D_{2,99}$ | $D_{2,100}$ |

TABLE 2-continued

Distance Matrix of 100 Sample Points

|  | Point 1 | Point 2 | Point 3 | ... | Point 99 | Point 100 |
|---|---|---|---|---|---|---|
| Point 3 | $D_{3,1}$ | $D_{3,3}$ | 0 | ... | $D_{3,99}$ | $D_{3,100}$ |
| ... | ... | ... | ... | ... | ... | ... |
| Point 99 | $D_{99,1}$ | $D_{99,2}$ | $D_{99,3}$ | ... | 0 | $D_{99,100}$ |
| Point 100 | $D_{100,1}$ | $D_{100,2}$ | $D_{100,3}$ | ... | $D_{100,99}$ | 0 |

Intuitively, extraction of the different cluster points may be based on the distance between the different points. So, it may be desirable to find the best threshold to separate in-cluster distance and out-cluster distance. To find this best threshold, a histogram distance matrix may be plotted. FIG. 6 shows a chart of an example histogram 600 of a distance matrix of the data points depicted in FIG. 5. The apparent valley of this histogram may be found to be around 5, and there may be peak values before and after this valley. The distance value smaller than the valley may be the in-cluster distance, and the distance value larger than the valley may be the out-cluster distance. By way of particular example and for purposes of illustration, the Otsu method may be used to find this best threshold because the Otsu method may be well suited to separate the background and foreground using the pixel's gray value histogram. For these 100 sample points, the Otsu method result may be 6.234. That means the distance smaller than this threshold is the in-cluster distance, and the corresponding points may belong to the same cluster, but if the distance larger than the threshold is out-cluster, and the corresponding points may belong to different clusters.

After the best threshold is obtained to classify the in-cluster distance and out-cluster distance, the best threshold is used to process the whole distance matrix. The distance value less than the threshold is labeled as True and the distance value larger than the threshold is labeled as False, as shown in Table 3.

TABLE 3

True/False Matrix of 100 Sample Points

|  | Point 1 | Point 2 | Point 3 (EC) | Point 4 | ... | Point 99 | Point 100 | Sum$_{True}$ |
|---|---|---|---|---|---|---|---|---|
| Point 1 | True | False | False | False | ... | False | True | 24 |
| Point 2 | False | True | True | True | ... | False | True | 30 |
| Point 3 (EC) | False | True | True | True | ... | True | False | 36 |
| Point 4 | False | True | True | True | ... | False | False | ... |
| ... | ... | ... | ... | ... | ... | ... | ... | ... |
| Point 99 | False | False | True | False | ... | True | False | 30 |
| Point 100 | True | True | False | False | ... | False | True | 28 |

In the True/False matrix, each True means that the corresponding points may belong to the same cluster, and each False means that the corresponding points may belong to different clusters. It may be desirable to extract the biggest cluster from this data set using this True/False matrix. As such, the number of True may be calculated for each point. The point that has the maximum number of True may be the point connected most other points within in-cluster distance. This point may be termed the estimate center (EC). In Table 3, Point 3 is found as having the maximum True (36) with other points, so Point 3 is the estimated center for the biggest cluster. Point 2 and Point 4, which connect to Point 3 (EC), may be within the in-cluster distance. Now, the Point 2 and Point 4 points may belong to the potential biggest cluster of the data set.

Reference is made to FIG. 7, which shows a chart 700 of an example cluster result of the data points representing the super-pixels depicted in FIGS. 5 and 6. FIG. 7 may represent a pre-cluster result to illustrate selection of the final cluster. Some of the points 702 associated with Point 2 and Point 4 may not belong to the same cluster, and may be near the estimated center within the in-cluster distance, as shown in FIG. 7. In FIG. 7, the point 704 may be the estimated center Point 3 (EC) and all the points 702 may belong to the potential biggest cluster 706, connecting to Point 3 within the in-cluster distance. The potential biggest cluster includes two kinds of data points: one kind of data points belonging to the real biggest cluster 708; another kind of data points are not, and they may be called outlier points 710. The outlier points 710 may be removed from the potential biggest cluster data points 706 and the real biggest cluster data points 708 may be obtained.

To remove the outlier points 710 from the potential biggest cluster 706, all of the points belonging to the potential biggest cluster 706 may be extracted from the True/False matrix to build the potential biggest cluster True/False matrix, as shown in Table 4. The outlier points 710 cause the False value in the potential biggest cluster True/False matrix. After all of the outlier points 710 are removed from the potential biggest cluster 706, the real biggest cluster True/False matrix will be filled all True without False. That means every two points in this cluster can be connected within the in-cluster distance.

TABLE 4

Potential Biggest Cluster True/False Matrix

|  | Point 2 | Point 3 | Point 4 | ... | Point 99 |  |
|---|---|---|---|---|---|---|
| Point 2 | True | True | True | ... | False |  |
| Point 3 | True | True | True | ... | True |  |
| Point 4 | True | True | True | ... | False | 36 |
| ... | ... | ... | ... | ... | ... |  |
| Point 99 | False | True | False | ... | True |  |

Three properties may help with removal of the outlier points 710 from the potential biggest cluster 706. These three properties are shown below:

Property 1. The number of false connections in the potential biggest cluster True/False matrix is twice the real number of false connections because each false connection may appear twice in the matrix;

Property 2. All the false connections connect between the outlier points and the inlier points because the false connection may be caused by outlier points and some of the inlier points. That means that the number of the false connection of all inlier points may be the same as the number of the false connections of all outlier points; and Property 3. The outlier points 710 may have more false connections than inlier points because the outlier points 710 may not belong to the real biggest cluster 708.

Here, a simple example to explain how to remove the outlier points 710 from the potential biggest cluster 706 may be used. For example, 7 sample points may be provided, and all of these points may be connected to the estimated center (EC) 704 within the in-cluster distance. The outlier points connecting some of the real inlier points may get the False connection, this condition may also be observed in the True/False matrix, as shown in Table 5. The outlier points may cause all of the False connections, and if these outlier points are removed, the True/False matrix will be filled all True value without False. The number of the false connection of all inlier points is 4 in this example, and the number of the false connection of all of the outlier points also is 4. This proves the Property 2. There are only 4 false connections, and there are 8 False value in the True/False matrix. This proves Property 1. The number of false connections to the outlier points are 3 and 3. They all larger than the number of false connections of any inlier point. This proves Property 3.

TABLE 5

7 Sample Points True/False Matrix

|   | 1 | 2 | 3 | 4 | 5 | 6 | 7 | # False |  |
|---|---|---|---|---|---|---|---|---------|---|
| 1 | True | False1 | True | True | True | False3 | True | 2 | Number of False |
| 2 | False1 | True | True | False2 | True | True | False4 | 3 | Connections of |
| 3 | True | True | True | True | True | True | True | 0 | Inlier Pointers |
| 4 | True | False2 | True | True | True | False5 | True | 2 | 2 + 2 + 0 + 1 + 1 = 6 |
| 5 | True | True | True | True | True | False6 | True | 1 | Number of False |
| 6 | False3 | True | True | False5 | False6 | True | True | 3 | Connections of |
| 7 | True | False4 | True | True | True | True | True | 1 | Outlier Pointers |
|   |   |   |   |   |   |   |   |   | 3 + 3 = 6 |

We use these properties for any potential biggest cluster True/False matrix. The number of False connections for each point may be calculated first, as shown in Table 5. Then, the number of false connections of each point from maximum to minimum may be sorted, as shown in Table 6. In the next step, the sorted number from the maximum value may be added to the minimum value one by one, until the partial sum is equal to the half of the whole list. The outlier points are the number of false connections included in this partial sum. In this example, the outlier point is Point 2 and Point 6 because 3+3=6=12/2.

TABLE 6

Sum = 12

| 3 | 3 | 2 | 2 | 1 | 1 | 0 |
|---|---|---|---|---|---|---|

Partial Sum = 6 == Sum/2 = 6 STOP

After using the same method to remove the outlier points 710 from the potential biggest cluster 706 from 100 sample points, the real biggest cluster 708 may be extracted from these 100 sample points. The points located in the potential biggest cluster 708, as shown in FIG. 7, are extracted as the real biggest cluster in this data set. All the value of this biggest cluster True/False matrix is True.

After the biggest cluster sample points are extracted, the original 100 sample points True/False matrix may be modified. All of the rows and columns of the biggest cluster sample points belonging to the biggest cluster sample points are modified as False. Then, the same process may be repeated to extract the second biggest cluster using this True/False matrix. For this 100 sample points data set, three clusters were extracted.

The same method may be applied to extract main cluster colors from the smooth super-pixels in raster ROI. These three main clusters of color results may be used to predict the depleted cartridge.

1.5.2 Depleted Cartridge Prediction

Firstly, the master and test raster ROI images may be transformed to the CMYK color space (block 318) because printers such as office printers, for instance, may commonly use these four kinds of cartridges to print. For each main cluster color super-pixels, the average C, M, Y, and K values for the master may be calculated and corresponding smooth super-pixels may be tested. In this process, the C, M, Y, and K values may each be from 0 to 1. If the difference of one channel between the master and test images is more than 0.1, the corresponding cartridge may be labeled as being depleted.

2.1 Text Fading Defect

Text fading defect is one of the most common defects in electrophotographic printers and may dramatically affect print quality. It usually appears in a significant symbol ROI, easily noticed by a user on his or her prints. Text fading may be detected by the density reduction for the black and white printed symbol ROI. It may be difficult to detect the color text fading only by density reduction because the depleted cartridge may only cause the color distortion without density reduction in the color printed symbol ROI.

In some techniques, the text fading detection method may only work on the black text fading defect detection. In contrast, the text fading detection method as described herein may detect color text fading defect and may predict the depleted cartridge. In this text fading detection method, the processor 102 may use the whole page image registration and median threshold bitmap (MTB) matching method to align the text characters between master and test symbol ROI, because the aligned test text characters may be easy to extract the difference from master text characters to detect text fading defect. The processor 102 may also use the gap statistic method to extract the different text characters' different colors to predict the depleted cartridge.

Color text fading defect may be found in the symbol ROI. In some examples, the processor 102 may extract four different ROIs from the input image, such as symbol, raster, vector, and background ROI (See, for example, FIG. 9). In the example described herein, the processor 102 may process the symbol ROIs for text fading defects. In each symbol ROI, the text fading defect may be detected first and the feature vector of text fading defect may be extracted. The feature vector may be used to classify the rank of text fading defect and predict the depleted cartridge. Part of this feature vector may be used for the whole page classification. The details of the ROI extraction process and the evaluation results will be described in the following sections.

2.2. Text Fading Detection and Classification Procedure

Figure 8:
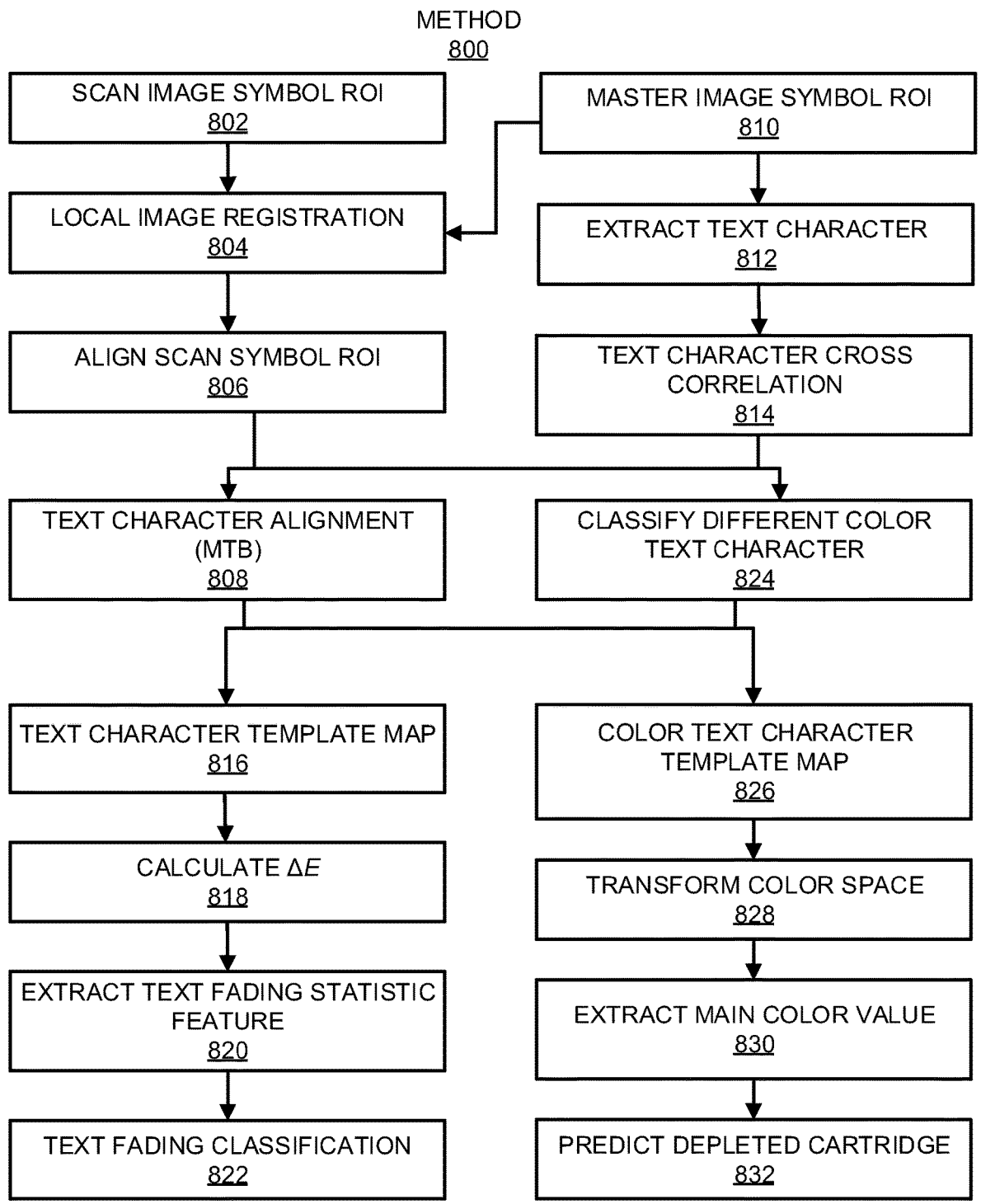
FIG. 8 shows a flow diagram of an example method for identifying text fading and classification.

In this section, the details of text fading detection and classification procedure are introduced. FIG. 8 shows a flow diagram of an example method 800 for identifying text fading and classification. This procedure includes three parts: text character alignment (blocks 802 to 808 and blocks 810 to 814), text fading classification (blocks 816 to 822), and depleted cartridge (blocks 824 to 832) prediction.

The first part is to align the text characters between the scanned test symbol ROI and master image symbol ROI. At block 802, the processor 102 may receive a scan image symbol ROI, which may be the same as the scanned image ROI 214 depicted in FIG. 2 for a symbol ROI. At block 804, the processor 102 may use the image registration algorithm to spatially align the scanned test image symbol ROI and master image symbol ROI first. This process may roughly align the corresponding symbol ROIs, but may not achieve alignment having a pixel-to-pixel accuracy. The processor 102 may use a median threshold bitmap (MTB) algorithm to align the corresponding text characters in the master and test symbol ROIs.

The second part is to detect the text fading defect. At block 818, the processor 102 may calculate a ΔE value between the corresponding text character in the test and master symbol ROIs in a predetermined color space, for instance, the CIE L*a*b* color space. By way of particular example and for purposes of illustration, the text fading detection will be described with respect to the CIE L*a*b* color space. The processor 102 may extract the statistic of CIE L*a' b' value and ΔE value to build the feature vector of text fading defect in symbol ROI to detect text fading defect.

The third part is to predict the depleted cartridge of the printer. In this part, by way of particular example and for purposes of illustration, a gap statistic method may be used to detect the number of text character colors. For each of the color text characters, the processor 102 may analyze the difference between the master and test symbol ROIs in the CMYK color space to predict the depleted cartridge. The symbol ROI text fading detection and classification process of the present disclosure is described in greater detail in the following sections.

2.3. Text Characters Alignment

Before the text fading defect is detected in a test image symbol ROI, the text characters may be aligned first because the difference between test and master text characters may be compared to determine whether there is a fading defect. This section includes two parts. The first part is to do the symbol ROI image registration (block 804), and the second part is to do the pixel to pixel text characters alignment (block 808) using the median threshold bitmap (MTB) method.

2.3.1 Symbol ROI Image Registration

A misalignment always exists in the scanned printed page comparing with the master image after it is printed from a printer and scanned by the scanner. This misalignment must be removed before the text fading detection is performed. One of the most common methods is the frequency-based approach, which calculates the phase correlation of two images in the Fourier domain. In some examples, there may be a halftone pattern in the scanned image.

In the image registration process (block 804), the first step is to convert the scanned test image and the master image to grayscale. In the next step, a scale-invariant feature transform (SIFT) method may be used to detect the scale-space interest points with a 128-element descriptor in both master and test images. In the SIFT method, the Difference-of-Gaussian (DoG) pyramid may be used to find all of the local extrema, as shown in Equation 2.1 The $G(x, y, k\sigma)$ is a variable scale Gaussian expressed in Equation 2.2; k is the scale parameter and it usually is 2; ff $(x, y, \sigma)$ is Laplacian-of-Gaussian (LoG) of image $l(x, y)$. These functions may be used to find points that are locally maximum or locally minimum in the three-dimensional space (x, y, kσ). For one extrema point, 26 neighbors may be considered in 3D neighborhoods.

$$D(x, y, \sigma) = [G(x, y, k\sigma) - G(x, y, \sigma)] * I(x, y) = \quad \text{Equation 2.1}$$
$$ff(x, y, k\sigma) - ff(x, y, \sigma)$$

$$G(x, y, k\sigma) = \frac{1}{2\pi\sigma^2} \exp - (x^2 + y^2)/2\sigma^2 \quad \text{Equation 2.2}$$

Because different scales o may be used across the DOG pyramid to detect the extrema point, achievement of greater precision in the localization of the extrema pixel-to-pixel in the original image is desirable. In order to do this, the second-order derivatives of $D(x, y, \sigma)$ at the sampling points in the DOG pyramid may be estimated. The extrema point with "subpixel" accuracy in the vicinity of where the DoG pyramid found the extrema point may be localized. The Taylor series expansion of $D(x, y, \sigma)$ in the vicinity of $$\vec{x_0} = (x_0, y_0, \sigma_0)^T,$$

which was found to be the location of an extrema in DoG pyramid, as shown in Equation 2.3. The x is the incremental deviation from $x_0$; J is the gradient vector estimated at $x_0$, as shown in Equation 2.4; H is the Hessian at $x_0$, as shown in Equation 2.5. Taking the derivative of both sides of the Taylor series expansion concerning the vector variable $\vec{x}$; and will get the result, as shown in Equation 6.

$$D(\vec{x}) \approx D(x_0) + J^T\big|_{(\vec{x}_0)}\vec{x} + \frac{1}{3}\vec{x}^T H(\vec{x}_0)\vec{x} \qquad \text{Equation 2.3}$$

$$J(\vec{x}_0) = \left(\frac{\partial D}{\partial x}, \frac{\partial D}{\partial y}, \frac{\partial D}{\partial \sigma}\right)^T \qquad \text{Equation 2.4}$$

$$H(\vec{x}_0) = \begin{bmatrix} \frac{\partial^2 D}{\partial x^2}, & \frac{\partial^2 D}{\partial x \partial y}, & \frac{\partial^2 D}{\partial x \partial \sigma} \\ \frac{\partial^2 D}{\partial y \partial x}, & \frac{\partial^2 D}{\partial y^2}, & \frac{\partial^2 D}{\partial y \partial \sigma} \\ \frac{\partial^2 D}{\partial \sigma \partial x}, & \frac{\partial^2 D}{\partial \sigma \partial y}, & \frac{\partial^2 D}{\partial \sigma^2} \end{bmatrix} \qquad \text{Equation 2.5}$$

$$0 \approx J(\vec{x}_0) + H(\vec{x}_0)\vec{x} \qquad \text{Equation 2.6}$$

$$\vec{x} = -H^{-1}(\vec{x}_0) \cdot J(\vec{x}_0)$$

The Normalized Cross-Correlation (NCC) method may be used to establish correspondence interest points between image pairs, as shown in Equation 2.7. Here, it is assumed that the test image is skewed by only a small angle concerning the master image. (S+1)×(S+1) window may be used around the corner pixel in the master image with the gray levels and the same window around the corresponding pixels may be used in the scanned test image. The NCC may be minimized to establish correspondences between the master and scanned test images.

$$NCC = \frac{\sum_{i=-S/2}^{S/2}\sum_{j=-S/2}^{S/2}(I_1[i,j] - m_1)(I_2[i,j] - m_2)}{\sqrt{\sum_{i=-S/2}^{S/2}\sum_{j=-S/2}^{S/2}(I_1[i,j] - m_1)^2 \sum_{i=-S/2}^{S/2}\sum_{j=-S/2}^{S/2}(I_2[i,j] - m_2)^2}} \qquad \text{Equation 2.7}$$

In Equation 2.7, S is the size of the window. $I_1$ and $I_2$ are the gray levels of each pair of interest points in both master and test symbol ROIs. $m_1$ and m2 are the average gray level of the windows in the master and test symbol ROIs. The NCC value will be between −1 and 1. Being 1 may mean a perfect match between two interest points around the comparison window.

The matched interest points may be a set of 2D coordinates. The processor 102 may calculate the geometric matrix to transform the interest points from the test symbol ROI to the corresponding interest points in the master symbol ROI. The 3×3 transformation matrix may remove the skew angle and translation distortion in the test symbol ROI. Four pairs of interest points may solve this matrix. In practice, it may be preferable to use more matched interest points to obtain a more accurate transformation matrix. The processor 102 may use the random sample consensus (RANSAC) algorithm to calculate the best transformation matrix. The processor 102 may process the test symbol ROI using the transformation matrix and obtain the aligned test symbol ROI. The processor 102 may remove small misalignments and get the pixel to pixel match between master and test text characters.

2.3.2 MTB for Text Characters Alignment

After the image registration between master and test symbol ROIs is done, a small misalignment may still exist for some part of the text characters in the test symbol ROI. There may be about 5 to 10 pixel misalignments between the master text characters and test text characters. The processor 102 may use the median threshold bitmap (MTB) method to align the text characters in the test symbol ROI one by one based on the master symbol ROI (block 808).

Before using the MTB method, the text characters may be extracted first. In some examples, the processor 102 may use an image thresholding method, such as the Otsu method, to extract the text characters from the master and test symbol ROI. Then, using the connected component to extract each text character bounding box from the master symbol ROI Otsu result. For each master text character bounding box, the processor 102 may crop out a bigger bounding box at the same position in the test symbol ROI. The bigger bounding box may be 20 pixels larger in the x and y direction than the master text character bounding box. The processor 102 may move the master text character bounding box on the test text character bounding box from left to right (x direction) and from top to bottom (y direction). At each moving step, the processor 102 may calculate the difference of these two binary maps in the overlapping area with an exclusive-or (XOR) operator.

After processing all of the positions, the processor 102 may obtain the minimum exclusive-or result position. If this position is in the center of the test text character bounding box, there is no misalignment. Otherwise, the processor 102 may calculate the shift in x and y directions to remove the misalignment between the master and test text characters, as shown in Equation 2.8. In Equation 2.8, M is the master text character connected component bounding box binary image; T is the test text character connected component bounding box binary image; [i, j] is the position of the pixels in the binary images; x, y is the shift pixels for the master binary image on the test binary image. After processing all of the text characters connected components in the test symbol ROI, a text character aligned symbol ROI image may be obtained. This result may be used to detect text fading defects in the following process. This method is much faster than the template matching method because the MTB only compares the byte-wise arithmetic.

$$\min_{shift\, x,y} \text{Error} = \sum_{i,j} XOR(M[i,j], T[i,j]) \qquad \text{Equation 2.8}$$

2.4. Text Fading Detection and Classification

In the previous section, the text characters in the test symbol ROI were aligned with the text characters in the master symbol ROI. In this section, the difference features between the master text characters and test text characters may be compared and extracted and then used to detect and classify the text fading defect.

2.4.1 Text Fading Defect Feature Vector Extraction

The most common way to compare the difference between different colors may be to calculate the ΔE (or color difference), which is the Euclidean distance between two colors in, for instance, the CIE L*a*b* color space. The average L*a*b* for each of the text characters in the master and test symbol ROIs may be calculated using the Equation 2.10. Then, Equation 2.9 may be used to calculate the ΔE value for each corresponding text character in the master and test symbol ROIs.

$$\Delta E_{(t)} = \qquad \text{Equation 2.9}$$

$$\sqrt{\left(L_{(t)ave}^{master} - L_{(t)ave}^{test}\right)^2 + \left(a_{(t)ave}^{master} - a_{(t)ave}^{test}\right)^2 + \left(b_{(t)ave}^{master} - b_{(t)ave}^{test}\right)^2}$$

$$L_{(t)ave} = \frac{\sum_{i=1}^{S} L_{(i)}}{s}, \; a_{(t)ave} = \frac{\sum_{i=1}^{S} a_{(i)}}{s}, \; b_{(t)ave} = \frac{\sum_{i=1}^{S} b_{(i)}}{s} \quad \text{Equation 2.10}$$

In Equation 2.9, t is the label for one special text character; $L_{master(t)ave}$ is the average L* value of text character t in master symbol ROI; $L_{test(t)ave}$ is the average L* value of text character t in test symbol ROI; $a_{master(t)ave}$, $a_{test(t)ave}$, and $b_{master(t)ave}$, and $b_{test(t)ave}$ conform to the same pattern. In Equation 2.10, S is the number of pixels for the special t text character.

After calculating the ΔE value for each text character, the average ΔE for all of the text characters may be obtained. This average text characters ΔE value may be the first feature extracted for text fading detection and classification. Using a similar method, the ΔE value between master symbol ROI text characters and white color may be calculated, which is (100, 0, 0) in the CIE L*a*b* color space. Also, the ΔE value between test symbol ROI text characters and white color may be calculated. The three ΔE features may be used to classify the text fading defect.

2.4.2 Text Fading Defect Multi-Classification

The processor 102 may classify the text fading defect to four different ranks based on a severity of the text fading defect. Rank A may mean no text fading defect in the symbol ROI; Rank B may mean there is text fading defect in the symbol ROI, and the defect does not affect the regular use of the printer page; Rank C may mean there is an observe text fading defect and people can find it easily; Rank D may mean there is are a lot of text fading defect and the defects influence the regular use of the printed page.

To train a four rank multi-classification model, the 120 symbol ROIs may manually be labeled as ground truth based on the text fading defect, which may include 30 rank A, 26 rank B, 30 rank C, and 34 rank D. In order to make a more balanced multi-classification model, the Directed Acyclic Graph-Support Vector Machine (DAG-SVM) method may be applied, which is a tree-structured classifier. DAG-SVM is more balanced than the One vs. Rest (OvR) strategy in the training process and more efficient than the One vs. One (OvO) strategy.

To evaluate this multi-classification result, the processor 102 may separate the 120 ground truth symbols ROIs to 5 folds. Each fold may include 24 symbol ROIs, and also each fold may include A/B/C/D four rank symbol ROIs. The multi-classification model may be evaluated by processing the cross-validation. Each fold may be used as a test set one time, and the other four folds may be used as training sets. The final confusion matrix for this five-folds cross-validation is shown in Table 7. The accuracy of this multi-classification model may be 86.7%, and the standard deviation of these five-fold test accuracy may be 0.137 with the worst accuracy 66.7% and the best accuracy 100%.

TABLE 7

Text fading defect DAG-SVM classification confusion matrix

|  | Predict A | Predict B | Predict C | Predict D |
| --- | --- | --- | --- | --- |
| Real A | 26 | 2 | 2 | 0 |
| Real B | 0 | 26 | 0 | 0 |
| Real C | 2 | 2 | 24 | 4 |
| Real D | 0 | 2 | 2 | 28 |

2.5. Predict the Depleted Cartridge

In the previous section, the text fading defect feature vector was extracted and the classification was ranked. However, the rank classification only shows the severity of the text fading defect, but which cartridge may be low and may need to be replaced may not be known. In this section, a method to predict the depleted cartridge (block 832) is described. Firstly, a cluster classification method may be used to classify different color text characters. Then, the possible depleted cartridge for each of the color text characters may be calculated.

2.5.1 Classify Different Color Text Characters

Before predicting the depleted cartridge, different color text characters may be classified because different color text characters may use different cartridges. For example, the symbol ROIs may include different color text characters, such as red, green, and black. The red text characters are useful for predicting yellow and magenta cartridge, and blue text characters are useful for predicting cyan and magenta cartridges. So, it may be necessary to detect and classify different color text characters. The number of colors in one symbol ROI may not be known and the K-means algorithm may not be directly used. To solve this problem, for instance, the gap statistic method may be used to calculate the number of colors in symbol ROI, and then, for instance, the K-means algorithm may be used to classify the different color text characters.

Firstly, the processor 102 may transform the master symbol ROI and test symbol ROI to a different color space (block 828), for instance, to the CMYK color space. The processor 102 may extract the pixels of each text character, and may calculate the average C, M, Y, and K channels for each text character for both master and test symbol ROIs.

In some examples, the processor 102 may use the gap statistic method and the K-means algorithm to classify the color text characters. The gap statistic method is a method to estimate the number of colors in one symbol ROI. The technique uses the output of the k-means algorithm, comparing the change in within-cluster dispersion with that expected under an appropriate reference null distribution. The processor 102 may calculate the gap from k=1 until k=5, k is the number of clusters trying to classify based on the data set. Suppose that the data has been clustered into k clusters, $C_1, C_2, \ldots, C_k$, with $C_r$ denoting the indices of observations in cluster r, and $n_r=|C_r|$. The sum of the pairwise squared Euclidean distances for all points in cluster r may be calculated by Equation 2.12, and may set Equation 2.13 to calculate the pooled within-cluster sum of squares around the cluster means $W_k$. The sample size of n is suppressed in this notation.

The sample symbol ROIs and the gap statistic plot from k=1 to k $$D_r = \sum_{x_i \in C_r} \sum_{x_j \in C_r} \|x_i - x_j\|^2 \qquad \text{Equation 2.12}$$

-continued $$W_k = \sum_{r=1}^{k} \frac{1}{2n_r} Dr \quad \text{Equation 2.13}$$

The idea of the gap statistic is to standardize the graph of log ($W_k$) by comparing it with its expectation under an appropriate null reference distribution of the data. The optimal number of clusters may be estimated and then the value of k for which log ($W_k$) may fall the farthest below this reference curve may be estimated. The maximum value of Equation 2.14 may be used to find the optimal number of clusters for the color text characters. In Equation 2.14, the E* denotes expectation under a sample of size n from the reference distribution. The optimal estimate k may be the value-maximizing $Gap_n(k)$ after the sampling distribution is taken into account.

$$Gap_n(k) = E_n^*\{\log(W_k)\} - \log(W_k) \quad \text{Equation 2.14}$$

The processor 102 may apply this gap statistic method for the color text characters to detect the optimal color clusters for one symbol ROI.

2.5.2 Predict the Depleted Cartridge

After the optimal cluster of the color text characters in one symbol ROI is determined, the K-means algorithm may be used to classify the text characters, and each cluster may include the same color text characters. This may be useful to detect the depleted cartridge. For each text character color in the master symbol ROI, the same color corresponding text characters may be extracted from the test symbol ROI, and the average $C_{test}$, $M_{test}$, $Y_{test}$, and $K_{test}$ values may be calculated. In the algorithm as disclosed herein, each of the C, M, Y, and K value ranges may be from 0 to 1. If the error between the master color channel value and the corresponding test color channel value is more than 0.1, the corresponding cartridge may be predicted as being depleted.

3.1. Streak Detection

Figure 9:
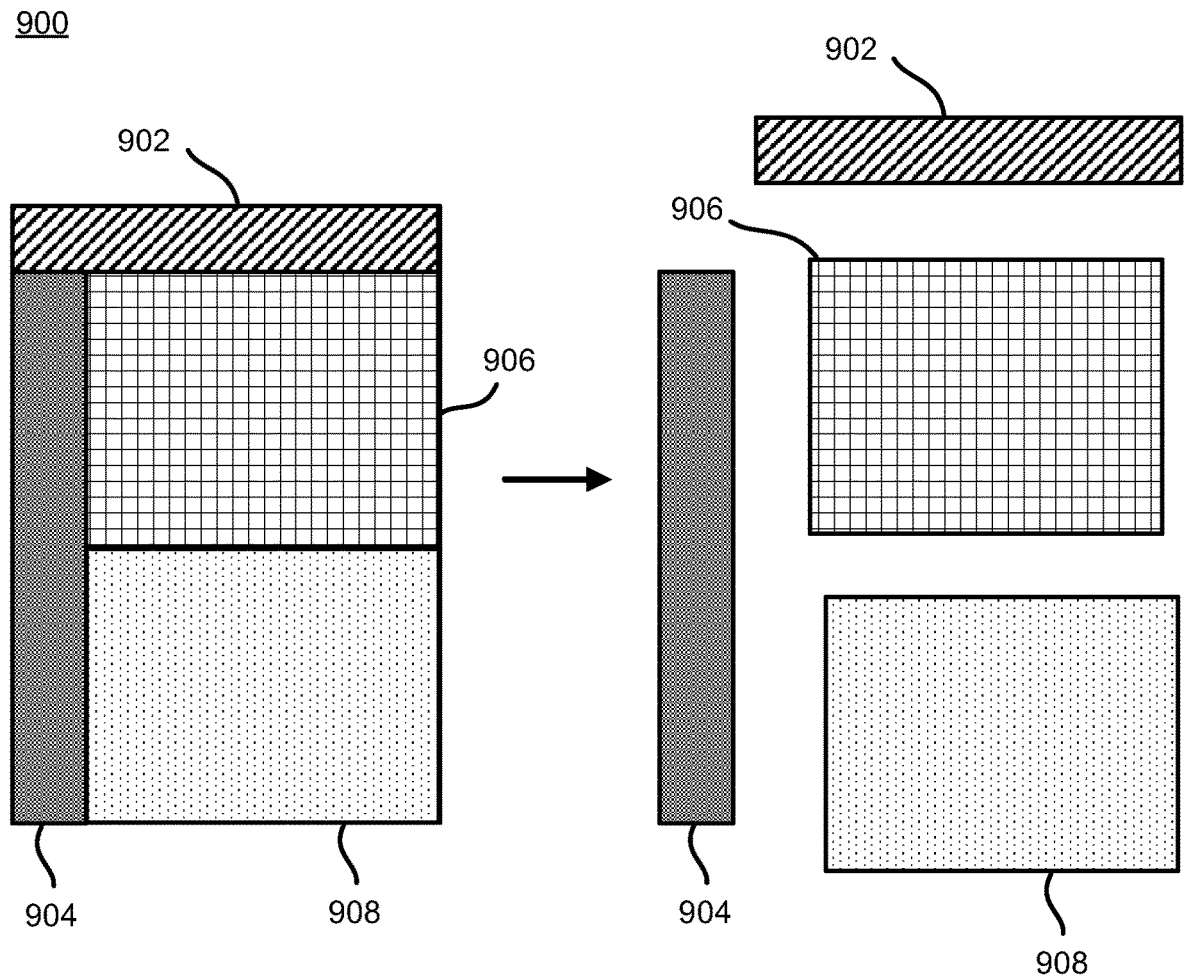
FIG. 9 shows a diagram of an example master image and corresponding extracted types of master image regions of interest (ROI) including a raster ROI.
Figure 10:
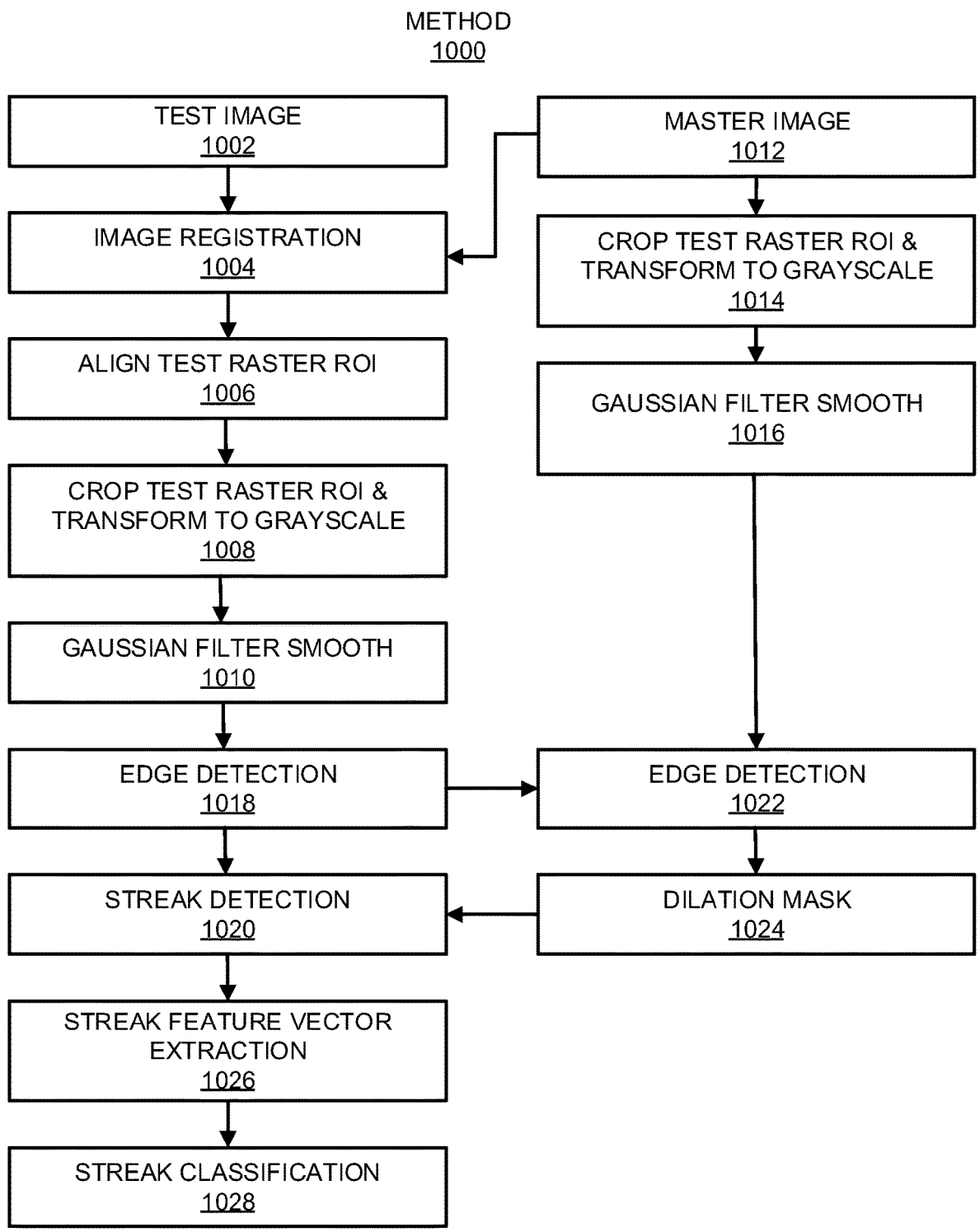
FIG. 10 shows a flow diagram of an example method for identifying Raster ROI streaking and classification.

Reference is made to FIGS. 9 and 10. FIG. 9 shows a diagram of an example master image 900 and corresponding extracted types of master image regions of interest (ROI) 902 to 908 including a raster ROI 908. FIG. 10 shows a flow diagram of an example method 1000 for identifying streak detection and classification. It should be understood that the example master image 900 depicted in FIG. 9 and the method 1000 depicted in FIG. 10 may include additional features and operations and that some of the features and operations described therein may be removed and/or modified without departing from the scope of the master image 900 and the method 1000. The descriptions of the master image 900 and the method 1000 are made with reference to the features depicted in FIGS. 1 to 2 for purposes of illustration.

A streak is one of the most common print defects in electrophotographic printers to influence print quality. Streak defects may be dark or light lines with the major axis along the printing process direction and may be caused by defective components in printers such as an Intermediate Transfer Belt (ITB), Organic Photo Conductor (OPC), or the like. As disclosed herein, a processor 102 may detect streak defects on a customer content area, which may be referred to as raster ROI. Detecting streaks on a customer content area may be more complicated than detecting streaks on uniform color printed pages because the customer content may influence and affect the streak detection result. Sometimes, the customer content may have some dark or light straight lines along the printing process, and they may be similar to streak defects. To detect the streak defects on the customer pages, the processor 102 may separate the straight lines in the customer content from the streak defects. To detect the streak in raster ROI, in some examples the Sobel Edge Detection algorithm and morphological operations for the master image may be used, which may include the customer content without defects, to remove the straight customer content lines on the scanned test pages. The remaining dark or light straight lines along the printing process direction may be the streak defects. In some examples, the DAG-SVM multi-classification method may be used to classify the rank of streak defect in raster ROI.

In some examples, the processor 102 may extract four different ROIs 902 to 908 from the master image 900, as shown in FIG. 9. The processor 102 may use the raster ROI 908 from the master image and the scanned test image. Most customer contents may be in the raster ROI 908, so the raster ROI 908 may be the most challenging area to detect streak defects compared with the symbol ROI 906, the vector ROI 904, and the background ROI 902. The symbol ROI 906, the vector ROI 904, and the background ROI 902 may all be uniform color areas, in which case certain methods for streak detection using standard test images may be used. In the present method as disclosed herein, the processor 102 may detect streak defects in the raster ROI 908. After detecting the streak defects in the raster ROI, the processor 102 may classify the raster ROI streak defect into a plurality of ranks, such as four ranks A, B, C, and D.

3.2. Raster ROI Streak Detection and Classification Procedure

This procedure may include three parts: raster ROI preprocessing part (blocks 1002 to 1016), streak defects detection part (blocks 1018 to 1024), and the raster ROI streak defects classification part (blocks 1026 to 1028). The first part is to preprocess the master and test images to extract the streak defects from raster ROIs. Because there may be misalignment between the corresponding master and test images, the alignment (blocks 1004 and 1006) may be performed first. Then, the processor 102 may extract the corresponding master and test raster ROIs and transform them to grayscale (blocks 1008 and 1014). In some examples, the scanned printed test raster ROI may include halftone patterns, and the processor 102 may use the Gaussian filter to smooth both the master and the test raster ROIs (blocks 1010 and 1016) and to remove the halftone patterns. This process may improve the streak detection result.

In the second part, the processor 102 may use an edge detection algorithm, for instance, the Sobel X-direction filter, which may be the same direction to the printing process direction, to process the master raster ROI (blocks 1018 and 1022). The Sobel X-direction filter process result may extract straight lines from customer content along the printing process direction in the master raster ROI. The dilation of the Sobel X-direction filter result may be used as a mask image (block 1024) to remove the customer content straight lines from test raster ROI. The processor 102 may detect streaks (block 1020), which may be the remaining dark or light straight lines along the printing process direction in test raster ROI may be the streak defects.

The third part is to classify the raster ROI streak defects. In this part, the feature vector (block 1026) of the raster ROI streak defects may be extracted. The multi-classification method classifies the raster ROI streak defects (block 1028) based on the streak defect feature vector. In some examples, the processor 102 may use the Directed Acyclic Graph-Support Vector Machine (DAG-SVM) for the multi-classification method.

After all of the processes of this method are implemented, the streak defects detection result and raster ROI streak defects classification result may be obtained. The details of the raster ROI streak defects detection and classification procedure are introduced in the following sections.

3.3. Raster ROI Preprocessing

In this section, the raster ROI preprocessing is introduced, which includes four steps: image registration, raster ROI extraction, color space transformation, and Gaussian smooth.

3.3.1 ROI Image Registration Raster

The input may be the master and scanned test images. Because of the printing precision and the scanner precision, there may always be misalignment between the master image and the scanned test image. So, before we use the master image raster ROI result to crop the corresponding raster ROI from the master and scanned test images, the processor 102 may perform image registration between master and scanned test images to remove the misalignment.

The processor 102 may use the SIFT method first to extract the interest points from the master and scanned test images. Then, the Normalized Cross-Correlation (NCC) may establish the correspondences of the interest points between the master and scanned test images. Finally, in some examples, a random sample consensus (RANSAC) algorithm may calculate the optimal transformation matrix based on the corresponding interest points, and the optimal transformation matrix may be used to process the scanned test image to remove the misalignment. In some examples, while the image registration process may remove certain misalignments, a small amount of misalignment between master and test images may still remain.

3.3.2 Raster ROI Extraction

The next step is to crop out the corresponding raster ROI from the master and aligned test images. The raster ROI result may include four numbers for each ROI: the left top pixel position and the right bottom pixel position.

3.3.3 Color Space Transformation and Gaussian Filter to Smooth Raster ROI

After the corresponding raster ROI is cropped out from the master and test images, the processor 102 may transform the master and aligned test raster ROI color space to grayscale. Because the halftone pattern is in the printed test image, the processor 102 may use the Gaussian filter to process the test image and remove the halftone pattern. For instance, for a 300 dpi scanned test image, the processor 102 may set the Gaussian filter size as 15 pixels×15 pixels with σ=2. Equation 3.1 shows the Gaussian smooth. The f (x, y) is the input grayscale image; g(i, j) is the 15×15 Gaussian Filter; and f (x, y) is the Gaussian smooth result.

$$f'(x, y) = \sum_{i=-7}^{7} \sum_{j=-7}^{7} f(x+i, y+j)g(i, j) \qquad \text{Equation 3.1}$$

3.4.1 Raster ROI Streak Detection

Streak defects may be dark or light straight lines along the printing process direction. To detect the streak defects, the customer content straight lines may be removed along the printing process directly from the test raster ROI. The remaining straight lines along the printing process direction will be the streak defects.

To extract the customer content straight lines, the processor 102 may use an edge detection algorithm, such as the Sobel operator. The Sobel operator is an edge detection algorithm that includes two 3×3 edge detection kernels: one for horizontal edge detection, and one for vertical edge detection. Equation 3.2 shows the Sobel operator computation process. A is the source image, which is the grayscale raster ROI in our project. $G_x$ and $G_y$ are two images that, at each point, contain the vertical and horizontal derivative approximations, respectively. In Equation 3.2, the symbol "*" denotes the 2-dimensional signal processing convolution operation.

$$G_x = \begin{bmatrix} +1 & 0 & -1 \\ +2 & 0 & -2 \\ +1 & 0 & -1 \end{bmatrix} * A \text{ and } G_y = \begin{bmatrix} +1 & +2 & +1 \\ 0 & 0 & 0 \\ -1 & -2 & -1 \end{bmatrix} * A \qquad \text{Equation 3.2}$$

In some examples, all of the scanned test images may be arranged in the same direction and the streak defects may be vertical lines on the scanned text images. The $G_x$ image may be enough to show all of the vertical lines on the master images and test images. The Sobel vertical edge filter may be used to process the grayscale master raster ROI and corresponding test raster ROI, and the vertical edge detection result may be normalized into the 0-255 grayscale value.

In some examples, noise may be found in the test raster ROI vertical edge detection results, and the processor 102 may use the Gaussian filter to smooth the test image. Here, removal of this noise from the test raster ROI vertical edge detection result may be desirable and only the customer content vertical lines and streak defects may be kept. The method may be to use the Sobel vertical edge filter to process the test raster ROI twice. Intuitively, the second derivative of the test raster ROI may be calculated in the horizontal direction to extract the vertical lines in the test raster ROI. The twice Sobel vertical edge filter result may be normalized into 0-255 grayscale. In some examples, application of the Sobel vertical edge filter twice may remove most of the noise in test raster ROI and only keep the customer content vertical lines and streak defects.

In some examples, the processor 102 may use the Otsu method for the master raster ROI Sobel vertical edge detection result and extract the customer content vertical lines. This Otsu result is a binary image, and resulting white pixels may be the customer content vertical lines. This binary image may be used as a mask to remove all of the customer content vertical lines from the test raster ROI. However, as previously described, even though the processor 102 performs the image registration between the master and the test images, there may still be a 5-20 pixel misalignment. To remove the influence of this misalignment between the master raster ROI and the test raster ROI, the processor 102 may dilate the Otsu result of the master raster ROI. The dilation kernel may be 9 pixels×9 pixels. The processor 102 may use this dilation result as a mask to remove the customer content vertical lines from test raster ROI.

In the next step, the processor 102 may use the dilation result of the master raster ROI vertical lines image to process the test raster ROI vertical lines detection result. Because the master raster ROI dilation result is the binary image and the foreground is the dilated vertical lines, this dilation image may be inversed and the vertical lines dilation areas may be to zero. Then, this inverse dilation master raster ROI image may be used to mask the test raster ROI vertical lines result from removing the customer content. Most of the customer content vertical lines may be removed from the test raster ROI vertical lines detection, but they may remain as streak defects.

In some instances, white lines may be streak defects in the test raster ROI. Some small white noise points may be observed. These small white areas may not be the streak defects and usually are noise vertical edge detection. It may be preferable to extract the apparent streak defects in vertical lines.

The vertical projection of the test raster ROI vertical lines image may be calculated without customer content and the red projection to result may be obtained. Because the vertical projection result fluctuates greatly, the processor 102 may use a 9 pixel average kernel to smooth the vertical projection result. In the smooth vertical projection result, the average vertical projection smooth result plus the standard deviation of vertical projection smooth result may be used as the threshold to label the streak defects corresponding columns. The streak defects column detection results may be used as short black bars. These streak defects column results may include all of the streak defects in the test raster ROI. However, a big low-value vertical projection area labeled in the red bounding box may be found. Even though this area may not include streak defects, the projection value may be much less than the other good print quality area vertical projection value. This is because the corresponding columns may include a large area of zero masks and may minimally reduce the vertical projection. This unsmooth projection result may sometimes influence the streak detection result because a large number of small vertical projection values may pull down the streak detection threshold. To solve this problem, the vertical projection value may be used to divide the number of non-zero pixels in the corresponding column and obtain the vertical non-zero average projection result. It may be much easier to extract streak defects in the raster ROI using this new vertical non-zero average projection result.

The last step of streak defects detection in the raster ROI is to extract the pixels of streak defects from the corresponding columns. The $\Delta E$ value for each corresponding pixel between the master raster ROI and the test raster ROI may first be calculated. Then, the Otsu method may be used to extract the high $\Delta E$ value pixels. These high value $\Delta E$ pixels may be the defect pixels, and these defect pixels in the streak defect columns may be extracted to get the streak defects in the raster ROI.

3.5. Raster ROI Streak Defects Classification

In this section, the feature vector of streak defects in the raster ROI may be extracted and the raster ROI streak defects for four different ranks may be classified. The requirement of four kinds of rank may be the same as the text fading classification requirement as previously described: Rank A may mean no streak defects in the raster ROI; Rank B may mean there are streak defects in the raster ROI, and the defect does not affect the regular use of the printer page; Rank C may mean there is an observe text fading defect and people can find it easily; Rank D may mean there is are a lot of text fading defect and the defects influence the regular use of the printed page.

Table 8 shows the six features for raster ROI streak defects. These features may be used to classify the raster ROI streak defects. The data set may include 37 raster ROI streak defects images, and they may be 13 images Rank A, 8 images Rank B, 7 images Rank C, and 9 images Rank D. The multi-classification model may be Directed Acyclic Graph-Support Vector Machine (DAG-SVM). To evaluate this multi-classification result, the cross-validation for this model may be applied. The processor 102 may separate 37 raster ROIs into 5 folds, such as (7/7/7/8/8) raster ROI streak defects ground truth for each fold. Each fold may be used as the test set one time, and the other four folds may be used as training sets. The final confusion matrix for this five-folds cross-validation is shown in Table 9. The accuracy of this multi-classification model may be 81.1%, and the standard deviation of these five-fold different test set accuracy may be 0.118 with the worst accuracy being around 57.1% and the best accuracy being around 87.5%.

TABLE 8

| 1 | The area of the streak defects; |
| 2 | The total width of the streak defects; |
| 3 | The average length of the streak defects; |
| 4 | The average sharpness of the streak defects; |
| 5 | The average $\Delta E$ of the streak defects; |
| 6 | The severity ($\Delta E \times streak_{area}$) of the streak defects; |

TABLE 9

|  | Predict A | Predict B | Predict C | Predict D |
| --- | --- | --- | --- | --- |
| Real A | 11 | 1 | 0 | 1 |
| Real B | 1 | 6 | 0 | 1 |
| Real C | 0 | 1 | 5 | 1 |
| Real D | 0 | 1 | 0 | 8 |

4.1. Banding Detection

Figure 11:
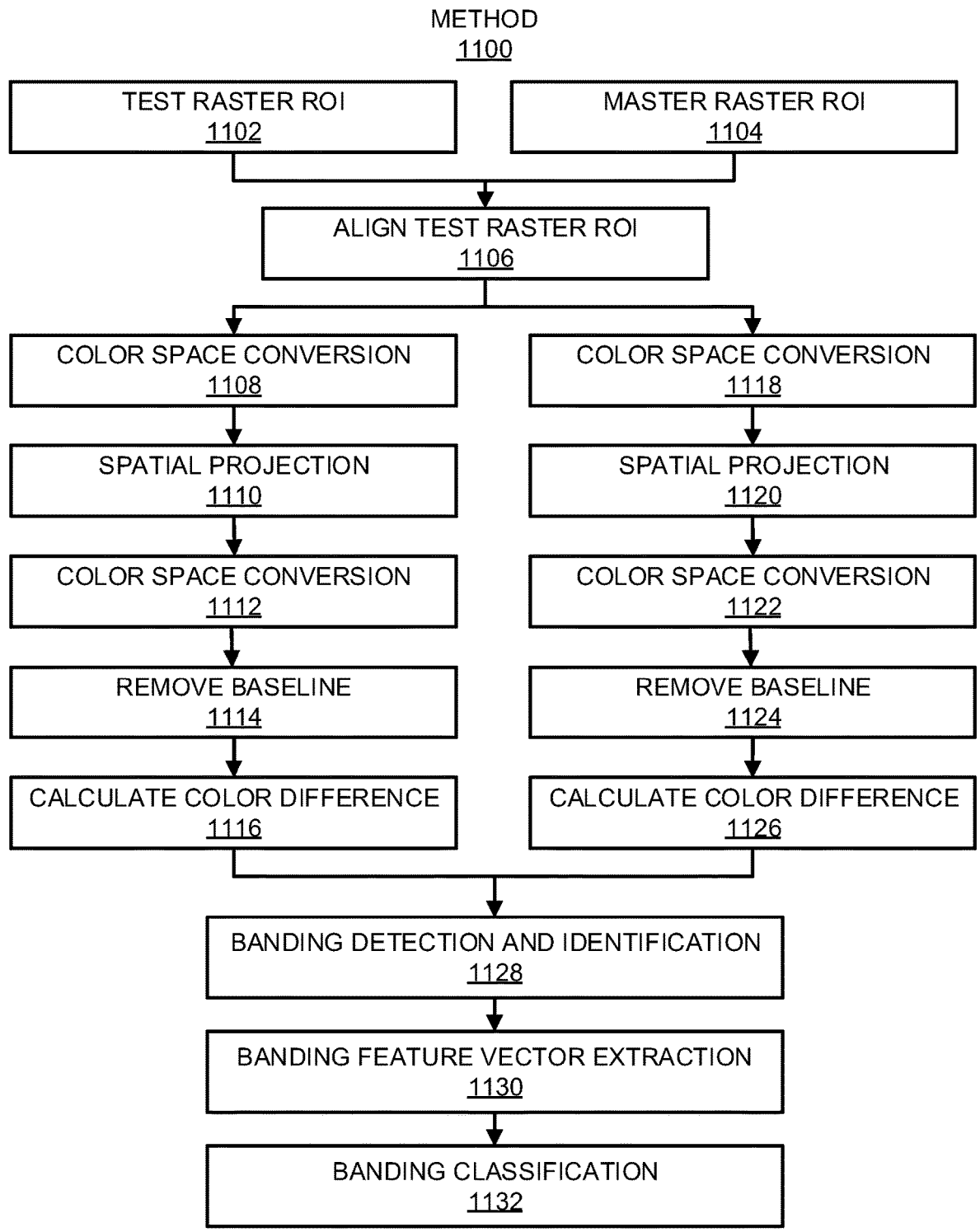
FIG. 11 shows a flow diagram of an example method for identifying banding and classification.

Reference is made to FIG. 11. FIG. 11 shows a flow diagram of an example method for identifying banding and classification. It should be understood that the method 1100 depicted in FIG. 11 may include preliminary and/or additional operations and that some of the operations described therein may be removed and/or modified without departing from the scope of the method 1100. The description of the method 1100 is made with reference to the features depicted in FIGS. 1 and 2 for purposes of illustration.

In some examples, the processor 102 may execute the method 1100 to detect bandings for printed content pages and raster region of interest (ROI). At block 1102, the processor 102 may obtain a test raster ROI. In some examples, the test raster ROI may be the scanned image ROI 214 depicted in FIG. 2. At block 1104, the processor 102 may obtain a master raster ROI, which may be the master image ROI 204 depicted in FIG. 2.

At block 1106, the processor 102 may align the test raster ROI and the master raster ROI. The steps to align the test raster ROI may be the same as the image registration and alignment operations in blocks 1004 and 1006, respectively, as depicted in FIG. 10.

First, at block 1108, the processor 102 may convert a color space of the pre-processed page or raster ROI. In one example, the color space may be converted from the RGB color space to the CIE1931 XYZ color space. At block 1110, the processor 102 may compute a spatial projection of the image. In some examples, in the CIE XYZ color space, a 1-D projection of the image along the scan direction be computed by calculating the mean value of each line in this direction.

At block 1112, the processor 102 may convert the color space of 1-D projections. For instance, the CIE XYZ be converted to the CIE L*a*b* color space. At block 1114, the processor 102 may subtract a baseline from each 1-D projection signal to make the bandings more obvious from the background. The baselines may be obtained by applying a 1-D median filter with a window size of ⅓ inch to each 1-D projection, respectively.

At block 1116, the processor 102 may determine the color difference. In some examples, the processor 102 may calculate the CIE ΔE units using the three baseline-removed projections in the CIE L*a*b* color space.

The processor 102 may process the master raster ROI at blocks 1118 to 1126. The description of blocks 1118 to 1126 to process the mater raster ROI may be the same as the description of blocks 1108 to 1116 to process the test raster ROI, and thus, the description of blocks 1118 to 1126 is omitted herein for brevity.

At block 1128, bandings may be identified based on the signed (or weighted) CIE ΔE. In some examples, the CIE ΔE may be weighted using a sign of the value for L*. Peaks, which are local maxima, in the signed CIE ΔE may be found. Peaks may be found by comparison of neighboring values. Then, the processor 102 may select a subset of peaks according to peak properties (such as height, width, distance and prominence). The selected subset peaks may be bandings that were detected in the Test Image or the Test ROI.

The thresholds of peak properties may be 1) height≥ Mean value of height+, ½ Std of height; 2) width≥3 pixels; and 3) distance between neighboring peaks≥5 mm (118 pixels at 600 dpi scanning resolution). Smaller peaks that cannot meet these thresholds may be removed until all remaining peaks satisfy these thresholds.

In some examples, the processor 102 may use the master image to distinguish the image texture from printed defects and to obtain more accurate banding detection results. However, even if a global registration between the printed page and its master image is performed, there may still be minor misalignments in the ROI.

To remove the minor misalignments, the processor 102 may first perform all of the above processes on the master ROI, to obtain two subsets peaks. Then, the processor 102 may use cross-correlation to perform the local registration between the pair of printed ROI and the master ROI, then compute the signed offset in both process direction and scan directions. $o_x$ may be used to symbolize the signed offset in the process direction. Next, each peak of the subset of printed ROI may be scanned, each peak's position may be marked as $p_i$, and the peak subset of the master ROI may be scanned, and whether there are peaks in the following position may be checked:

$$\text{Position} = p_i + o_x \qquad \text{Equation 4.1}$$

where i=1, 2, . . . indicate peaks of subset of printed ROI.

If a peak appears on the position of the Master ROI, the processor 102 may remove this peak from the subset of printed ROI. Through this step, the remaining peak may be closely related to printed defects and will not be affected by the texture or content of the image.

4.2. Banding Feature Extraction and Quality Ranking Classification

Referring to FIG. 11, at block 1130, the processor 102 may extract banding features, which may represent the severity of bandings. The feature vectors extracted from a banding profile may include:

| | |
|---|---|
| 1. | The total number of bandings |
| 2. | The absolute mean value of signed delta E |
| 3. | The absolute mean value of signed delta E per area |
| 4. | The average width |
| 5. | The average height |
| 6. | The highest height |
| 7. | The largest widths |

At block 1132, the processor 102 may classify the banding. In some examples, several classification models may be adopted to predict the severity of the printed bandings.

The processor 102 may execute the method 1100 to build the predictor training with 186 printed ROIs. The 186 ROIs may manually label the ground truth into four ranks (A, B, C, and D) based on severity of their bandings. Rank A may mean that the printed ROI has no bandings, e.g., that the printing quality is almost perfect. The subsequent ranks B, C, and D may indicate that banding defects are becoming more and more obvious and the print quality is getting worse. Ranks and quantity are shown in Table 10.

TABLE 10

| Rank A | Rank B | Rank C | Rank D | Total |
|---|---|---|---|---|
| 75 | 63 | 33 | 15 | 186 |

In some examples, any of three machine learning models may be used to build predictors. The support vector machine may include One-vs-Rest (OvR) and One-vs-One (OvO), the logistic regression, and the random forest.

One-vs-Rest (OvR, also known as One-vs-All or OvA) is a heuristic method that uses a binary classification algorithm for multi-classification. It means splitting a multi-class data set into multiple binary classification problems. Then the processor 102 may train a binary classifier for each binary classification problem and use the most confident model to make predictions.

The One-vs-One (OvO) is another heuristic method that uses binary classification algorithms for multi-classification. This method also splits the multi-category classification data set into binary classification problems. However, the One-vs-One approach may split the data sets into one data set for each class versus every other class.

Random forest is a learning algorithm based on a set of individual decision trees. Each tree in the random forest spits out a class prediction and the class with the most votes becomes the model prediction. A large number of relatively unrelated decision trees working as organizations will exceed any single decision tree.

Before the training process, a randomly split tool may be used to randomly split the data sets into 70% training data and 30% test data. Two scores may be used to evaluate the classification results: Accuracy score and Balanced accuracy score.

$$BalancedAccuracy = \frac{1}{2}\left(\frac{TP}{TP+FN} + \frac{TN}{TN+FP}\right) \qquad \text{Equation 4.2}$$

Figure 12:
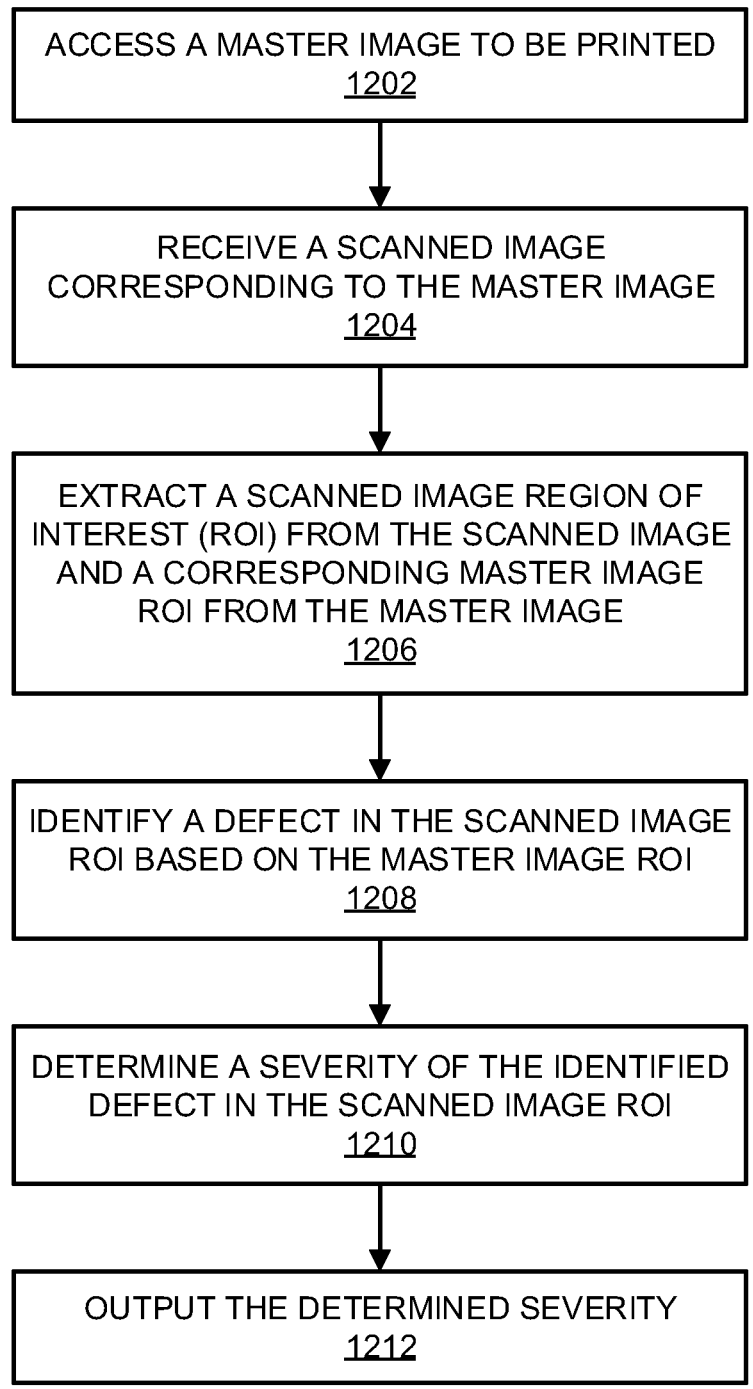
FIG. 12 shows a flow diagram of an example method for identifying a defect in a scanned image ROI based on a master image ROI.

Various manners in which the processor 102 may operate are discussed in greater detail with respect to the method 1200 depicted in FIG. 12. FIG. 12 depicts a flow diagram of an example method for identifying a defect in a scanned image ROI based on a master image ROI. It should be understood that the method 1200 depicted in FIG. 12 may include additional operations and that some of the operations described therein may be removed and/or modified without departing from the scope of the method 1200. The description of the method 1200 is made with reference to the features depicted in FIGS. 1 to 11 for purposes of illustration.

At block 1202, the processor 102 may access a master image to be printed. The master image may be the master image 202 depicted in FIG. 2. At block 1204, the processor 102 may receive a scanned image corresponding to the master image. The scanned image may be the same as the scanned image 212 depicted in FIG. 2. In some examples, the scanned image 212 may be received from a scanner that scans printed images as they are printed.

At block 1206, the processor 102 may extract a scanned image region of interest (ROI) 214 from the scanned image 212 and a corresponding master image ROI 204 from the master image 202.

At block 1208, the processor 102 may identify a defect in the scanned image ROI 214 based on the master image ROI 204. In some examples, the identified defect may be color fading, text fading, streaking, and/or banding and a type of the scanned image ROI may include a raster ROI, a symbol ROI, a background ROI, and/or a color vector ROI. The identified defect may be associated with the type of the scanned image ROI 214. For instance, the text fading defect may be associated with the symbol ROI for processing text characters.

At block 1210, the processor 102 may determine a severity of the identified defect 216 in the scanned image ROI. The severity of the identified defect 216 may be a ranking. At block 1212, the processor 102 may output the determined severity.

In some examples, based on a determination that the identified defect is color fading, the processor 102 may segment the master image ROI 204 into a plurality of groups of pixels. The processor 102 may extract dominant colors of the select groups of pixels, the extracted dominant colors being identified based on a distance matrix including a difference in colors of the select groups of pixels. In some examples, the groups of pixels may be super-pixels and the select groups of pixels may be smooth super-pixels. The processor 102 may identify a difference between the extracted dominant colors and corresponding dominant colors in the scanned image ROI 214. The processor 102 may predict a depleted cartridge of colorant based on the identified difference of in dominant colors. The processor 102 may identify a plurality of data points corresponding to the select groups of pixels and may generate the distance matrix including a distance between each of the plurality of data points to each other in a color space.

In some examples, the processor 102 may determine a threshold distance value corresponding to an in-cluster distance. The processor 102 may determine clusters corresponding to the dominant colors of the select group of pixels based on the determined threshold distance value.

In some examples, based on a determination that the identified defect is text fading, the processor 102 may extract text characters from the scanned image ROI 214 and may classify the extracted text characters based on a plurality of colors. The processor 102 may determine a color difference between the scanned image ROI 214 and the master image ROI 204 for each of the plurality of colors of the extracted text characters and may predict a depleted cartridge of colorant based the determined color difference for each of the plurality of colors of the extracted text characters.

In some examples, based on a determination that the identified defect is streaking, the processor 102 may extract edges of an image included in the master image ROI 204 and may filter an image object from the scanned image ROI 214 based on the extracted edges. The processor 102 may identify streaks in the filtered scanned image ROI 214.

In some examples, based on a determination that the identified defect is banding, the processor 102 may calculate a spatial projection of the scanned image ROI 214 along a printer scan direction of the printed master image 202 and the scanned image 212. In this regard, the spatial projection may be calculated for each dimension of a color space. The processor 102 may remove a baseline from the calculated spatial projection. The baseline may be obtained by applying a median filter to the spatial projection. The processor 102 may determine a color difference value of the scanned image ROI 214 using the baseline-removed spatial projection of the scanned image ROI 214. The processor 102 may weight the determined color difference value of the scanned image ROI 214 based on a sign of a projection for one dimension of the color space. The processor 102 may identify bandings based on peaks found in the weighted color difference value.

Some or all of the operations set forth in the method 1200 may be included as utilities, programs, or subprograms, in any desired computer accessible medium. In addition, the method 1200 may be embodied by computer programs, which may exist in a variety of forms both active and inactive. For example, they may exist as computer-readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

Figure 13:
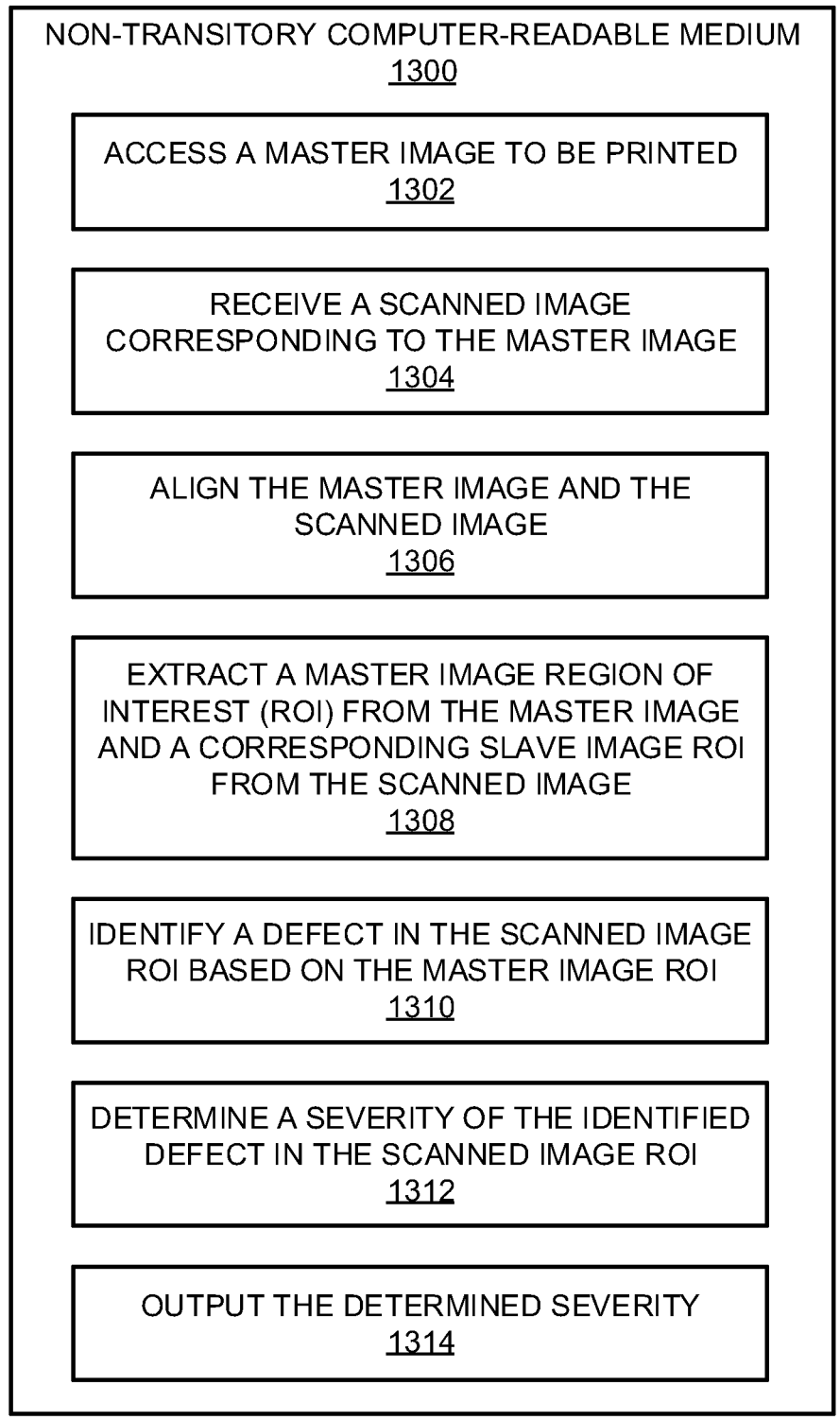
FIG. 13 depicts a block diagram of an example non-transitory computer-readable medium that may have stored thereon computer-readable instructions to identify a defect in the scanned image ROI based on the master image ROI.

Turning now to FIG. 13, there is shown a block diagram of a non-transitory computer-readable medium 1300 that may have stored thereon computer-readable instructions identify a defect in the scanned image ROI 214 based on the master image ROI 204. It should be understood that the computer-readable medium 1300 depicted in FIG. 13 may include additional instructions and that some of the instructions described herein may be removed and/or modified without departing from the scope of the computer-readable medium 1300 disclosed herein. The computer-readable medium 1300 may be a non-transitory computer-readable medium. The term "non-transitory" does not encompass transitory propagating signals.

The computer-readable medium 1300 may have stored thereon computer-readable instructions 1302-1314 that a processor, such as the processor 102 depicted in FIGS. 1 and 2, may execute. The computer-readable medium 1300 may be an electronic, magnetic, optical, or other physical storage device that contains or stores executable instructions. The computer-readable medium 1300 may be, for example, Random-Access memory (RAM), an Electrically Erasable Programmable Read-Only Memory (EEPROM), a storage device, an optical disc, or the like.

The processor may fetch, decode, and execute the instructions 1302 to access a master image 202 to be printed. The processor may fetch, decode, and execute the instructions 1304 to receive a scanned image 212 corresponding to the master image 202. In some examples, the scanned image 212 may be scanned at the printer as the printed image is printed. The processor may fetch, decode, and execute the instructions 1306 to align the master image 202 and the scanned image 212.

The processor may fetch, decode, and execute the instructions 1308 to extract a master image ROI 204 from the master image 202 and a corresponding scanned image ROI 214 from the scanned image 212. The processor may fetch, decode, and execute the instructions 1308 to identify a defect in the scanned image ROI 214 based on the master image ROI 204. In this regard, the identified defect may be color fading, text fading, streaking, and/or banding and a type of the scanned image ROI 214 may include a raster ROI, a symbol ROI, a background ROI, and/or a color vector ROI. In some examples, the identified defect may be associated with the type of the scanned image ROI 214. The processor may fetch, decode, and execute the instructions 1312 may determine a severity of the identified defect in the scanned image ROI. The processor may fetch, decode, and execute the instructions 1314 to output the determined severity.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A non-transitory machine-readable medium storing instructions executable by a processor to perform processing comprising:
   accessing a master image to be printed;
   receiving a scanned image corresponding to the master image;
   identifying a color fading defect in a scanned image region of interest (ROI) based on the master image;
   determining a severity of the identified color fading defect of the scanned image; and
   outputting the determined severity,
   wherein identifying the color fading defect comprises:
   aligning the scanned image ROI to a corresponding master image ROI, each of the scanned and master image ROIs being a raster image ROI;
   segmenting the master image ROI into a plurality of groups of pixels;
   extracting select groups of pixels among the plurality of groups of pixels, each of the select groups of pixels having an approximately uniform color;
   extracting dominant colors of the select groups of pixels; and
   identifying a difference between the extracted dominant colors and corresponding dominant colors in the scanned image.

2. The apparatus non-transitory machine-readable medium of claim 1, wherein the processing comprises:
   predicting a depleted cartridge of colorant based on the identified difference.

3. The non-transitory machine-readable medium of claim 2, wherein extracting the dominant colors from the select groups of pixels comprises:
   identifying a plurality of data points corresponding to the select groups of pixels; and
   generating a distance matrix including a distance between each of the plurality of data points to each other in a color space.

4. The non-transitory machine-readable medium of claim 3, wherein the processing comprises:
   determining a threshold distance value corresponding to an in-cluster distance; and
   determining clusters corresponding to the dominant colors of the select group of pixels based on the determined threshold distance value.

5. A non-transitory machine-readable medium storing instructions executable by a processor to perform processing comprising:
   accessing a master image to be printed;
   receiving a scanned image corresponding to the master image;
   identifying a text fading defect by a first identification technique or by a second identification technique;
   determining a severity of the identified text fading defect of the scanned image; and
   outputting the determined severity,
   wherein the first identification technique comprises:
   extracting text characters from a scanned image region of interest (ROI);
   aligning each of the text characters in the scanned image ROI with a corresponding text character in a master image ROI; and
   determining a color difference between the scanned image ROI and the master image ROI for each of the text characters;
   and wherein the second identification technique comprises:
   extracting the text characters from the scanned image ROI;
   classifying the extracted text characters based on a plurality of colors; and
   determining the color difference between the scanned image ROI and the master image ROI for each of the plurality of colors of the extracted text characters.

6. The non-transitory machine-readable medium of claim 5, wherein the processing comprises:
   predicting a depleted cartridge of colorant based on the determined color difference.

7. A method comprising:
   accessing, by a processor, a master image to be printed;
   receiving, by the processor, a scanned image corresponding to the master image;
   identifying, by the processor, a text streaking defect;
   determining a severity of the identified text streaking defect of the scanned image; and
   outputting the determined severity,
   wherein identifying the text streaking defect comprises:
   extracting edges of an image included in a master image region of interest (ROI);
   filtering an image object from a scanned image region of interest (ROI) to remove the extracted edges so that these edges will not be detected as streaks; and
   identifying streaks in the filtered scanned image ROI.

8. The method of claim 7, comprising:
   extracting the edges using a horizontal or vertical edge filter that removes horizontal or vertical lines associated with the image object.

9. The apparatus of method claim 7, comprising:
   transforming, by the processor, a color space of the master image ROI and the scanned image ROI to grayscale; and applying, by the processor, a Gaussian filter to smooth the master image ROI and the scanned image ROI.

10. The of method claim 7, comprising:
extracting, by the processor, a feature vector associated with the identified streaks; and
determining the severity of the identified text streaking defect based on the extracted feature vector for the identified streaks.

11. A method comprising:
accessing, by a processor, a master image to be printed;
receiving, by the processor, a scanned image corresponding to the master image;
identifying, by the processor, a banding defect;
determining a severity of the identified banding defect of the scanned image; and
outputting the determined severity,
wherein identifying the banding defect comprises:
  calculating a spatial projection of a scanned image region of interest (ROI) along a printer scan direction of the printed master image and the scanned image, the spatial projection being calculated for each dimension of a uniform color space;
  removing a baseline from the calculated spatial projection, the baseline being obtained by applying a median filter to the spatial projection;
  determining a color difference value of the scanned image ROI using the spatial projection of the scanned image ROI from which the baseline has been removed;
  weighting the determined color difference value of the scanned image ROI based on a sign of lightness channel of the uniform color space; and
  identifying bandings based on peaks found in the weighted color difference value.

12. The method of claim 11, comprising:
aligning, by the processor, the scanned image ROI with a master image ROI, and identifying peaks in weighted color difference values for the master image ROI;
identifying the bandings based on the peaks found in the weighted color difference values of the scanned image ROI but not in a calculated position of weighted color difference values of the master image ROI;
extracting, by the processor, a banding feature vector based on the identified bandings; and
determining the severity of the identified banding defect based on the extracted banding feature vector for the identified bandings.

* * * * *